US012434136B2

(12) United States Patent
Guo et al.

(10) Patent No.: US 12,434,136 B2
(45) Date of Patent: Oct. 7, 2025

(54) METHOD AND APPARATUS FOR CONTROLLING FRONT SIGHT IN VIRTUAL SCENARIO, ELECTRONIC DEVICE, AND STORAGE MEDIUM

(71) Applicant: Tencent Technology (Shenzhen) Company Limited, Shenzhen (CN)

(72) Inventors: Chuyuan Guo, Shenzhen (CN); Mingcheng Zhao, Shenzhen (CN); Yangzi Chenxiao, Shenzhen (CN); Hanxuan Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 266 days.

(21) Appl. No.: 18/226,120

(22) Filed: Jul. 25, 2023

(65) Prior Publication Data

US 2023/0364502 A1 Nov. 16, 2023

Related U.S. Application Data

(63) Continuation of application No. PCT/CN2022/127078, filed on Oct. 24, 2022.

(30) Foreign Application Priority Data

Jan. 10, 2022 (CN) ......................... 202210021991.6

(51) Int. Cl.
*A63F 13/22* (2014.01)
*A63F 13/52* (2014.01)
(Continued)

(52) U.S. Cl.
CPC .............. *A63F 13/22* (2014.09); *A63F 13/52* (2014.09); *A63F 13/537* (2014.09); *A63F 13/837* (2014.09)

(58) Field of Classification Search
CPC ........ A63F 13/20; A63F 13/219; A63F 13/22; A63F 13/40; A63F 13/42; A63F 13/426;
(Continued)

(56) References Cited

U.S. PATENT DOCUMENTS 8,660,310 B2 * 2/2014 Mathe ..................... G06T 17/05
382/103
2010/0281439 A1 * 11/2010 Markovic ................. G06T 3/20
715/863

(Continued)

FOREIGN PATENT DOCUMENTS

CN 111202975 A 5/2020
CN 111672119 A 9/2020
(Continued)

OTHER PUBLICATIONS

Tencent Technology, ISR, PCT/CN2022/127078, Jan. 12, 2023, 3 pgs.
Tencent Technology, WO, PCT/CN2022/127078, Jan. 12, 2023, 4 pgs.

*Primary Examiner* — Omkar A Deodhar
(74) *Attorney, Agent, or Firm* — Morgan, Lewis & Bockius LLP

(57) ABSTRACT

This application discloses a method for controlling a front sight of a virtual prop in a virtual scenario performed by an electronic device a non-transitory computer-readable storage medium. The method includes: displaying a first virtual object in the virtual scenario, the first virtual object having an adsorption detection range; in response to an aiming operation on the virtual prop, acquiring a displacement direction and a displacement velocity of the front sight associated with the aiming operation; acquiring an adsorption correction factor associated with the displacement direction when it is determined that an aiming target of the aiming operation is correlated with the adsorption detection
(Continued)

range based on the displacement direction; and displaying a dynamic movement of the front sight at a target adsorption velocity after adjusting the displacement velocity by the adsorption correction factor.

20 Claims, 14 Drawing Sheets

(51) Int. Cl.
*A63F 13/537* (2014.01)
*A63F 13/837* (2014.01)

(58) Field of Classification Search
CPC .......... A63F 13/44; A63F 13/45; A63F 13/50; A63F 13/52; A63F 13/55; A63F 13/58; A63F 13/837; A63F 2300/10; A63F 2300/30; A63F 2300/55; A63F 2300/60; A63F 2300/64; A63F 2300/643; A63F 2300/646
See application file for complete search history.

(56) References Cited

U.S. PATENT DOCUMENTS

| | | | | |
|---|---|---|---|---|
| 2016/0158641 | A1* | 6/2016 | Summons | A63F 13/219 463/31 |
| 2018/0017679 | A1* | 1/2018 | Valouch | G01S 17/06 |
| 2018/0133583 | A1* | 5/2018 | Tran | G06F 3/00 |
| 2021/0339124 | A1* | 11/2021 | Liu | A63F 13/92 |
| 2022/0152478 | A1* | 5/2022 | Li | A63F 13/422 |

FOREIGN PATENT DOCUMENTS

| | | | |
|---|---|---|---|
| CN | 112138385 | A | 12/2020 |
| CN | 113144593 | A | 7/2021 |
| CN | 113398574 | A | 9/2021 |
| CN | 114344880 | A | 4/2022 |

* cited by examiner

METHOD AND APPARATUS FOR CONTROLLING FRONT SIGHT IN VIRTUAL SCENARIO, ELECTRONIC DEVICE, AND STORAGE MEDIUM

CROSS-REFERENCE TO RELATED APPLICATIONS

This application is a continuation application of PCT Patent Application No. PCT/CN2022/127078, entitled "METHOD AND APPARATUS FOR CONTROLLING FRONT SIGHT IN VIRTUAL SCENARIO, ELECTRONIC DEVICE, AND STORAGE MEDIUM" filed on Oct. 24, 2022, which claims priority to Chinese Patent Application No. 202210021991.6, entitled "METHOD AND APPARATUS FOR CONTROLLING FRONT SIGHT IN VIRTUAL SCENARIO, ELECTRONIC DEVICE, AND STORAGE MEDIUM" filed with the Chinese Patent Office on Jan. 10, 2022, all of which is incorporated herein by reference in its entirety.

FIELD OF THE TECHNOLOGY

This application relates to the field of computer technologies, and in particular, to a method and apparatus for controlling a front sight in a virtual scenario, an electronic device, and a non-transitory computer-readable storage medium.

BACKGROUND OF THE DISCLOSURE

With the development of computer technology and the diversification of terminal capabilities, more and more kinds of games can be played on the terminal. Among them, shooter game (STG) is one of the most popular games and usually provides a virtual scenario in which a player can control virtual objects to play against others by using shooting props.

SUMMARY

According to embodiments of this application, a method and apparatus for controlling a front sight in a virtual scenario, an electronic device, and a non-transitory computer-readable storage medium are provided, which can not only improve the aiming precision of a virtual prop, but also improve the efficiency of human-machine interaction. The technical solutions are as follows:

According to an aspect, a method for controlling a front sight of a virtual prop in a virtual scenario performed by an electronic device is provided, the method including:

displaying a first virtual object in the virtual scenario, the first virtual object having an adsorption detection range; in response to an aiming operation on the virtual prop, acquiring a displacement direction and a displacement velocity of the front sight associated with the aiming operation; acquiring an adsorption correction factor associated with the displacement direction when it is determined that an aiming target of the aiming operation is correlated with the adsorption detection range based on the displacement direction; and displaying a dynamic movement of the front sight at a target adsorption velocity after adjusting the displacement velocity by the adsorption correction factor.

In a possible implementation, the target adsorption velocity is a velocity vector, where the magnitude of the velocity vector is acquired by adjusting the displacement velocity based on the adsorption correction factor, and the vector direction of the velocity vector is acquired by adjusting the displacement direction based on the adsorption point of the front sight.

According to an aspect, an electronic device is provided, the electronic device including one or more processors and one or more memories, the one or more memories storing at least one computer program, the at least one computer program being loaded and executed by the one or more processors and causing the electronic device to implement the foregoing method for controlling a front sight of a virtual prop in a virtual scenario.

According to an aspect, a non-transitory computer-readable storage medium is provided, the storage medium storing at least one computer program, the at least one computer program being loaded and executed by a processor of an electronic device and causing the electronic device to implement the foregoing method for controlling a front sight of a virtual prop in a virtual scenario.

The technical solutions provided in the embodiments of this application have at least the following beneficial effects:

On the basis of the aiming operation originally performed by the user, if it is determined that the aiming target is correlated with the adsorption detection range of the first virtual object, it indicates that the user has the intention to aim the first virtual object. At this time, by applying an adsorption correction factor to the original displacement velocity and adjusting the displacement velocity by the adsorption correction factor, the adjusted target adsorption velocity better suits the user's aiming intention, so that the front sight can focus on the aiming target more accurately, and the efficiency of human-machine interaction is greatly improved.

DESCRIPTION OF EMBODIMENTS

Figure 1:
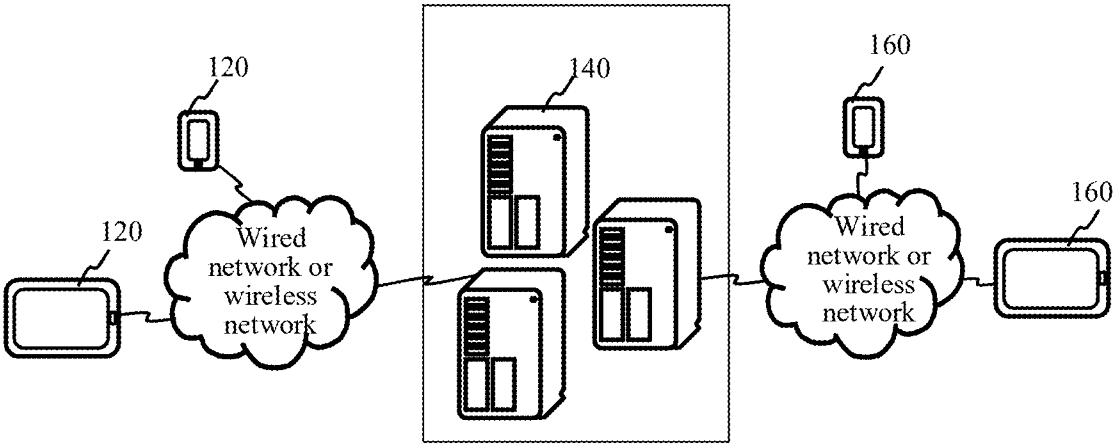
FIG. 1 is a schematic diagram of an implementation environment of a method for controlling a front sight in a virtual scenario according to an embodiment of this application.

To make the objectives, technical solutions, and advantages of this application clearer, the following further describes implementations of this application in detail with reference to the accompanying drawings.

The terms "first", "second" and the like used in this application are used for distinguishing same or similar items that are basically the same in function and effect. It is to be understood that, there is no logical or temporal dependency among the terms "first", "second" and "nth", nor is there any limitation made to the quantity or the execution sequence. In this application, the term "at least one" refers to one or more, and the term "multiple" refers to two or more. For example, "multiple first positions" refer to two or more first positions. In this application, the term "includes at least one of A or B" refers to the following cases: include only A, include only B, and include both A and B.

Virtual scenario: a virtual environment that is displayed (or provided) when an application runs on a terminal. A virtual scenario can be a simulation environment reflecting the real world, a virtual environment featuring partial simulation and partial fabrication, or a virtual environment featuring entire fabrication. A virtual scenario can be any of a two-dimensional (2D) virtual scenario, a 2.5D virtual scenario or a 3D virtual scenario. The dimensions of the virtual scenario are not limited in embodiments of this application. For example, a virtual scenario can include sky, land, sea, etc. The land can include environmental elements such as deserts and cities, and the user can control the movement of a virtual object in the virtual scenario. In some embodiments, the virtual scenario can be used for providing virtual scenario-based confrontation between at least two virtual objects, and there are virtual resources available for the at least two virtual objects in the virtual scenario.

Virtual object: a movable object in a virtual scenario. The movable object can be a virtual character, a virtual animal, a cartoon character and the like, such as: characters, animals, plants, oil barrels, walls, stones and other things that are displayed in a virtual scenario. The virtual object may be a virtual image used to represent the user in the virtual scenario. The virtual scenario may include a plurality of virtual objects, and each virtual object has a shape and a volume in the virtual scenario, and occupies some space in the virtual scenario. In some embodiments, when the virtual scenario is a three-dimensional virtual scenario, the virtual object can be a three-dimensional model which may be a three-dimensional character built based on three-dimensional human skeleton technology, and the same virtual object can show different external images by putting on different skins. In some embodiments, the virtual object may alternatively be implemented using a 2.5D or 2D model, which is not limited in the embodiments of this application.

In some embodiments, the virtual object can be a player character controlled by an operation on a client, or a non-player character (NPC) set in virtual scenario-based interaction. In some embodiments, the virtual object can be a virtual character participating in the competition in a virtual scenario. In some embodiments, the number of virtual objects participating in the interaction in the virtual scenario can be set in advance or dynamically determined according to the number of clients participating in the interaction.

Shooter game (STG): a kind of game in which a virtual object conducts remote attack using virtual props such as firearms. As a sub-genre of action games, STG has distinct characteristics of action games. In some embodiments, shooter games include, but are not limited to, first-person shooting (FPS), third-person shooting, overlooking shooting, heads-up shooting, platform shooting, scroll shooting, keyboard-and-mouse shooting games, shooting range games, etc., and the types of shooting games are not specifically limited in the embodiments of this application.

First-Person Shooting (FPS): FPS is a branch of action games, but like Real-Time Strategy (RTS) games, it has evolved into a separate type as it spreads quickly all over the world. FPS is a shooter game in which the user can use the first-person perspective (that is, the subjective perspective of the player). The picture of the virtual scenario in the game is observed from the perspective of the virtual object controlled by the terminal. In the FPS game, instead of manipulating the virtual objects on the screen like in other games, the user can experience personally the visual impact brought by the game, which greatly enhances the proactivity and reality of the game. Generally, FPS games provide richer plots, exquisite pictures and vivid sound effects.

In the FPS game, at least two virtual objects are involved in a single-game confrontation mode in the virtual scenario. One virtual object achieves the purpose of surviving in the virtual scenario by avoiding the attack launched by the other virtual object and the dangers existing in the virtual scenario (e.g., virtual gas circle, virtual swamp, etc.). When the hit point of the virtual object in the virtual scenario drops to zero, it indicates that the life of virtual object in the virtual scenario is over. The other virtual object that survives in the virtual scenario is the winner. In some embodiments, regarding the above confrontation, the moment when the first terminal joins the game is taken as the start moment, the moment when the last terminal exits the game is taken as the end moment, and each terminal can control one or more virtual objects in the virtual scenario. In some embodiments, the competition mode of confrontation includes single-player confrontation, two-player small-group confrontation or multi-player large-group confrontation, etc., which is not limited in the embodiments of this application.

Taking an FPS game as an example, in the virtual scenario, the user may control the virtual object to fall freely, glide, or fall after a parachute is opened in the sky; or to run, jump, creep, or move forward in a stooped posture on the land; or control the virtual object to swim, float, or dive in the ocean. Certainly, the user may further control the virtual object to ride in a virtual vehicle (such as a virtual car, a virtual aircraft, a virtual yacht or the like) to move in the virtual scenario. The foregoing scenarios are merely used as an example for illustration herein, which is not specifically limited in the embodiments of this application. The user can also control the virtual object to confront other virtual objects through virtual props. For example, the virtual props include: throwing props that only work when thrown, shooting props that only work when launched, and cold weapons for close-range attacks.

Field Of View (FOV): the field of view of a camera mounted on a master virtual object of a current terminal, measured in a unit of degrees. In other words, the angular extent of the virtual scenario at which the camera can capture images is called the FOV of the master virtual object. In the FPS game, because the user observes the virtual scenario from the first-person perspective, the view of the master virtual object in the FPS game refers to the virtual scenario picture that can be seen on a display (i.e., the terminal screen). The virtual scenario picture represents the field of view of the game world that the master virtual object can observe at present.

Front sight: in the FPS game, the front sight is located in the central point within the field of view, and is configured to indicate the landing point of the projectile of the virtual prop when the user launches shooting. In FPS games which tend to be playful rather than realistic in style, the front sight is located in the center of the screen and is used to assist in the aiming operation of the virtual prop, representing the logical direction in which the projectile of the virtual prop flies off.

Observation device: a virtual device in FPS games which is usually made of metal. When no sighting telescope is assembled, a virtual prop and an aiming target are positioned in the same straight line to assist the virtual prop in aiming at a specific aiming target, and at this time the angle of the camera moves behind the sighting telescope of the virtual prop, so that the virtual prop can achieve accurate aiming, and can also zoom in and out to a certain extent to provide higher availability within a further range. When a sighting telescope is assembled, a scale or a specially designed line of sight is usually provided to magnify an image of the aiming target to the retina, making the aiming operation easier and more accurate; and the magnifying power is directly proportional to the objective diameter of the sighting telescope. A larger objective diameter can make the image clearer and brighter, but a higher magnification may be accompanied by a reduced field of view.

Shooting with opened telescope: that is, when a sighting telescope is assembled, the sighting telescope is first opened (referred to as opening the telescope), the front sight is adjusted to aim at the aiming target, and then the virtual prop is triggered to complete firing.

Shooting without opened telescope: i.e., shoot from hip. Shoot from hip is a kind of original aiming point shooting, since no telescope is opened during firing, the accuracy of front sight in shooting is low during shoot from hip, and deviation or shaking easily occurs.

Firing animation: associated animation of a virtual prop that is played along with the firing of the virtual prop in shooting games, which is usually used to show the movement of the body and parts of the virtual prop along with the firing. For example, the firing animation involves the front and back movements of the body of the virtual prop, the linkage action of pulling the handle (that is, the firing mechanism on the body), the front and back movement of an upper sliding sleeve, the linkage action of movable parts on the body and the like, so as to enhance the reality and immersion brought by the firing.

Character animation: associated animation of a virtual object that is played along with the firing of the virtual prop in shooting games, which is usually used to show the firing action of a virtual object holding a virtual prop. For example, character animation involves the actions of a virtual object when it is subject to recoil force of the virtual prop in the vertical and horizontal direction. The above actions include, but are not limited to, the swing of the upper body of the virtual object, the follow-up of the lower limbs, the vibration of the arms, head movements and facial expressions, etc., in order to truly represent the power of the virtual props when firing, and enhance the sense of reality and immersion in shooting games.

Aim assist: In FPS games, auxiliary aiming function can be added when the game is played without keypad or mouse. Compared with the operation of playing shooting games by using keyboard and mouse, the operation of playing games on the mobile terminal by using handle and touch screen is usually more demanding and difficult, and the user may not be accustomed to its mode of operation on the mobile terminal. By adding the auxiliary aiming function, the user can operate the game smoothly on the mobile terminal. In terms of performance, controlling the steering of the camera helps the front sight to automatically aim at the aiming target within the field of view.

Active adsorption: the active adsorption in this embodiment of this application means that when the player actively initiates an aiming operation, since the player has the intention to actively move the front sight to the aiming target (the target at which is intended to be aimed in this shooting), when the aiming target is correlated with the adsorption detection range of any virtual object in the virtual scenario (for example, it is within the adsorption detection range, or moves from the outside of the adsorption detection range to the inside of the adsorption detection range), the active adsorption logic is triggered, and under the active adsorption logic, the front sight automatically points the aiming target towards the virtual object and follows the virtual object for a short time. In some embodiments, when the user moves the front sight or fires against the virtual prop, the active adsorption logic can be triggered provided that the above determining conditions of active adsorption are met.

Passive adsorption: the passive adsorption in this embodiment of this application means that when the player does not initiate an aiming operation, since the front sight is located within the adsorption detection range of any virtual object in the virtual scenario, provided that the aiming operation of the user is not relied on, the front sight is automatically controlled to be adsorbed onto the virtual object at a certain velocity and follow the virtual object for a short time.

Skeleton socket: a socket mounted on the skeleton of the object model of the virtual object. The head skeleton point and the somatic skeleton point in this embodiment of this application both belong to the skeleton socket, where the head skeleton point is mounted on the head skeleton of the object model, and the somatic skeleton point is mounted on the body skeleton of the object model. The position of the skeleton socket relative to the model skeleton remains unchanged, that is, the skeleton socket moves along with the model skeleton.

The system architecture involved in this application is described in detail below.

FIG. 1 is a schematic diagram of an implementation environment of a method for controlling a front sight in a virtual scenario according to an embodiment of this application. Referring to FIG. 1, the implementation environment includes: a first terminal 120, a server 140, and a second terminal 160.

An application supporting virtual scenarios is run and mounted on the first terminal 120. In some embodiments, the application includes: any of the FPS games, third-person shooting games, Multiplayer Online Battle Arena (MOBA) games, virtual reality applications, 3D map application, or multiplayer equipment survival games. In some embodiments, the first terminal 120 is a terminal used by the first user. When the first terminal 120 runs the application, the user interface of the application is displayed on the screen of the first terminal 120, and the virtual scenario is loaded and displayed in the application based on the opening operation of the first user in the user interface. The first user uses the first terminal 120 to operate the first virtual object located in the virtual scenario to carry out activities, the activities including, but not limited to: adjusting at least one of body posture, crawling, walking, running, cycling, jumping, driving, picking, shooting, attacking, throwing, and confrontation. Schematically, the first virtual object is a first virtual character, such as a simulated character role or a cartoon character role.

The first terminal 120 and the second terminal 160 are in direct or indirect communication with the server 140 by using a wireless network or wired network. The server 140 includes at least one of a server, a plurality of servers, a cloud computing platform or a virtualization center. The server 140 is configured to provide a backend service for an application that supports virtual scenarios. In some embodiments, the server 140 undertakes the main computing work, whilst the first terminal 120 and the second terminal 160 undertake the secondary computing work; alternatively, the server 140 undertakes the secondary computing work, whilst the first terminal 120 and the second terminal 160 undertake the primary computing work; alternatively, a distributed computing architecture is used for collaborative computing among the server 140, the first terminal 120 and the second terminal 160.

In some embodiments, the server 140 is an independent physical server or a server cluster or distributed system consisting of multiple physical servers, or a cloud server providing basic cloud computing services such as cloud services, a cloud database, cloud computing, cloud functions, cloud storage, network services, cloud communication, middleware services, domain name services, security services, Content Delivery Network (CDN), and big data and artificial intelligence platforms.

An application supporting virtual scenarios is run and mounted on the second terminal 160. In some embodiments, the application includes any of the FPS games, third-person shooting games, MOBA games, virtual reality applications, 3D map application, or multiplayer shooting survival games. In some embodiments, the second terminal 160 is a terminal used by the second user. When the second first terminal 160 runs the application, the user interface of the application is displayed on the screen of the second terminal 160, and the virtual scenario is loaded and displayed in the application based on the opening operation of the second user in the user interface. The second user uses the second terminal 160 to operate the second virtual object located in the virtual scenario to carry out activities, the activities including, but not limited to: adjusting at least one of body posture, crawling, walking, running, cycling, jumping, driving, picking, shooting, attacking, throwing, and confrontation. Schematically, the second virtual object is a second virtual character, such as a simulated character role or a cartoon character role.

In some embodiments, the first virtual object controlled by the first terminal 120 and the second virtual object controlled by the second terminal 160 are in the same virtual scenario, and at this moment, the first virtual object can interact with the second virtual object in the virtual scenario. Schematically, the first virtual object and the second virtual object are in a confrontational relationship. For example, the first virtual object and the second virtual object are in different camps, and the virtual objects in the confrontational relationship can interact with each other in a confrontational manner on land, such as throwing props at each other. In other embodiments, the first virtual object and the second virtual object are in a collaborative relationship. For example, the first virtual character and the second virtual character are in the same camp, the same team or in friendly relationship or have temporary communication rights.

In some embodiments, the applications mounted on the first terminal 120 and the second terminal 160 are the same, or the applications installed on the two terminals are the same type of applications belonging to different operating system platforms. The first terminal 120 and the second terminal 160 each generally refer to one of a plurality of terminals, and this embodiment of this application is illustrated by using the first terminal 120 and the second terminal 160 as an example.

The first terminal 120 and the second terminal 160 are of the same or different device types including: at least one of a smartphone, a tablet computer, a smart speaker, a smartwatch, a smart handheld game console, a portable gaming device, a vehicle-mounted terminal, a portable laptop computer and a desktop computer, which is not limited thereto. For example, the first terminal 120 and the second terminal 160 are both smart phones or other handheld portable game devices. In the following embodiments, the terminal including a smartphone is used as an example for description.

A person skilled in the art may understand that there may be more or fewer terminals. For example, there may be only one of the foregoing terminal, or there may be dozens or hundreds of the foregoing terminals, or more terminals. The number and device type of the terminals are not limited in the embodiments of this application.

Figure 2:
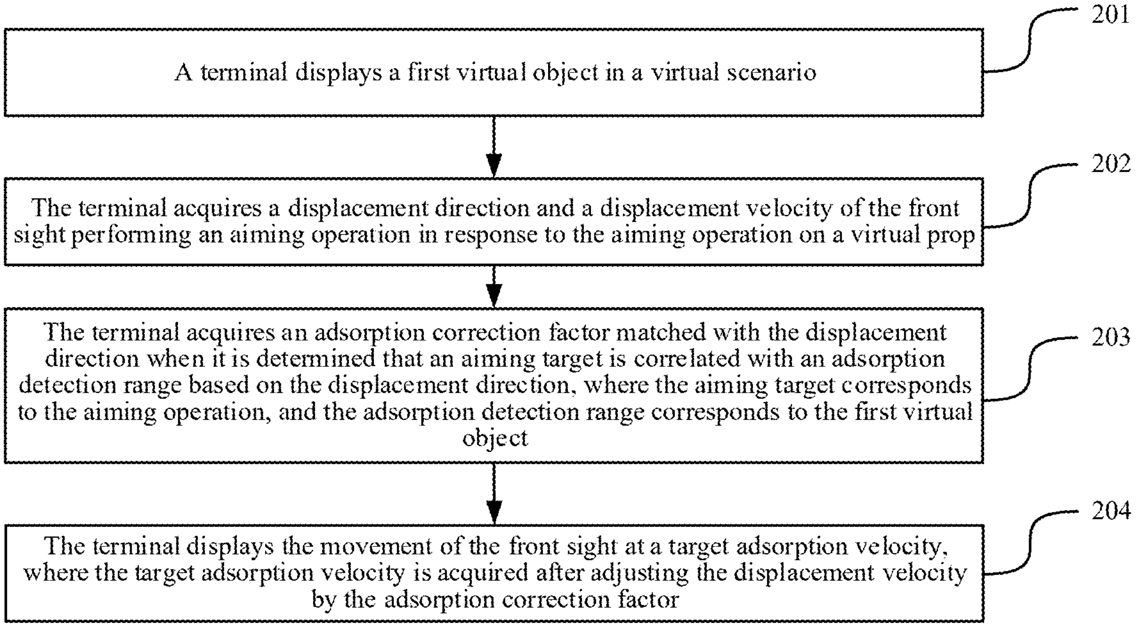
FIG. 2 is a flowchart of a method for controlling a front sight in a virtual scenario according to an embodiment of this application.

FIG. 2 is a flowchart of a method for controlling a front sight in a virtual scenario according to an embodiment of this application. Referring to FIG. 2, the embodiment is executed by an electronic device and is illustrated by using an example of an electronic device as a terminal. The embodiment includes the following steps:

201: A terminal displays a first virtual object in a virtual scenario.

The terminal refers to an electronic device used by the user. For example, the terminal may be a smartphone, a smart handheld game console, a portable gaming device, a tablet computer, a notebook computer, a desktop computer, a smart speaker, a smartwatch or the like, but is not limited thereto. An application supporting a virtual scenario is mounted and run on the terminal. Schematically, the application refers to a game application or a game client. For example, this embodiment of this application is illustrated by taking a game client of a shooting game as an example, which, however, does not cause a limitation to the type of games corresponding to the game client.

The first virtual object refers to a virtual object in the virtual scenario that can be adsorbed, including but not limited to: virtual items, virtual buildings, virtual objects (such as wild monsters) that are not controlled by the user, artificial intelligence (AI) objects that accompany a player to play games, virtual objects controlled by other terminals in the same game, etc., and the type of the first virtual object is not specifically limited in this embodiment of this application.

In some embodiments, the user starts the game client on the terminal, and logs in to the game client using the user's game account. Next, the user interface is displayed in the game client, which covers account information of the game account, a selection control of a game mode, a selection control of a scenario map and an opening option. The user can select the game mode he/she wants to open through the selection control of a game mode; and can select the scenario map he/she wants to enter through the selection control of the map scenario. After the user makes selection, the terminal is triggered to enter a new round of game competition by performing a triggering operation on the opening option.

Notably, the above selection of a scenario map is not a step that requires to be implemented. For example, in some games, users are allowed to choose a scenario map on their own, while in other games, they are not allowed to choose a scenario map on their own (instead, the server randomly allocates the scenario map of the current round of game at its beginning). Alternatively, in some game modes, users are allowed to choose a scenario map on their own, while in other game modes, they are not allowed to select a scenario map on their own. No limitation is specifically made in this embodiment of this application as to whether the user needs to select a scenario map before the opening, and whether the user has the right to choose a scenario map.

For example, when the current round of game is taken as the target game, after the user performs a triggering operation on the opening option, the game client enters the target game and loads the virtual scenario corresponding to the target game. In some embodiments, the game client downloads multimedia resources of the virtual scenario from the server, and renders the multimedia resources of the virtual scenario by using a rendering engine, thus displaying the virtual scenario in the game client. The target game is any game that supports the auxiliary aiming function for the master virtual object.

In some embodiments, the terminal displays the master virtual object in the virtual scenario, where the master virtual object refers to the virtual object currently controlled by the terminal (also known as the master operations virtual object, controlled virtual object, etc.). In some embodiments, the terminal pulls the multimedia resources of the master virtual object from the server and renders the multimedia resources of the master virtual object by using the rendering engine, thus displaying the master virtual object in the virtual scenario.

In some embodiments, for some FPS games, since the virtual scenario is viewed from the first-person perspective (that is, the perspective of the master virtual object), the virtual scenario picture displayed in a terminal screen is obtained by observing the virtual scenario from the perspective of the master virtual object. However, it does not necessarily require to display the master virtual object in the virtual scenario picture, for example, it is feasible to display only the back of the master virtual object, or only part of the body (such as the upper body) of the master virtual object, or not display the master virtual object. Whether the master virtual object is displayed in the virtual scenario is not specifically limited in this embodiment of this application.

In some embodiments, the terminal determines a first virtual object located within the field of view of the master virtual object, where the first virtual object may be adsorbed and is located within the field of view of the master virtual object. The terminal pulls the multimedia resources of the first virtual object from the server and renders the multimedia resources of the first virtual object by using the rendering engine, thus displaying the first virtual object in the virtual scenario.

202: The terminal acquires a displacement direction and a displacement velocity of the front sight performing an aiming operation in response to the aiming operation on a virtual prop.

The virtual prop refers to a prop having projectiles and assembled on the main control virtual object. After being triggered by the firing operation of the user, the virtual prop ejects the corresponding projectile of the virtual prop to the landing point indicated by the front sight, so that the projectile acts after arriving at the landing point, or acts in advance when encountering obstacles (such as walls, bunkers, vehicles, etc.) on the way to the landing point.

In some embodiments, the virtual prop is a shooting prop or a throwing prop. When the virtual prop is a shooting prop, the projectile refers to a projectile loaded inside the virtual props; and when the virtual prop is a throwing prop, the projectile refers to the virtual prop itself. The virtual prop is not specifically limited in this embodiment of this application.

In some embodiments, the user assembles the virtual prop on the master virtual object under the control of the terminal. For example, after the master virtual object picks up the virtual prop, the terminal displays the virtual prop in a virtual backpack of the master virtual object; when the user selects the virtual prop in the virtual backpack, the terminal provides an assembly option for the virtual prop, and in response to a triggering operation on the assembly option, controls the master virtual object to assemble the virtual prop to a virtual prop bar or an equipment bar, so as to, e.g., establish a binding relationship between the master virtual object and the virtual prop.

In some embodiments, after the user controls the master virtual object to pick up the virtual prop by using the terminal, the system automatically assembles the virtual prop on the master virtual object. Whether the virtual prop is automatically assembled after being picked up is not specifically limited in this embodiment of this application.

In some embodiments, the logic of automatically picking up the virtual prop can be triggered once the master virtual object gets close to the virtual prop in the virtual scenario, and then the system automatically adds the virtual prop to the virtual backpack of the master virtual object. In some embodiments, the logic of manually picking up the virtual prop can be triggered once the master virtual object gets close to the virtual prop in the virtual scenario, at this time, a pickup control of the virtual prop emerges in the virtual scenario, and the terminal, in response to the triggering operation on the pickup control, controls the master virtual object to pick up the virtual prop. Whether to automatically pick the virtual prop is not specifically limited in this embodiment of this application.

In some embodiments, instead of being picked up by the master virtual object after the beginning of the game, the virtual prop brought into the target game is pre-selected by the user before the opening, that is, the virtual prop is assembled on the master virtual object in the initial state of the virtual scenario. Whether the virtual prop is selected before the opening or picked up after the opening is not limited in this embodiment of this application.

In some embodiments, when the virtual prop is assembled, the user performs a triggering operation on the virtual prop so that the terminal, in response to the triggering operation on the virtual prop, switches a prop currently used by the master virtual object to the virtual prop. In some embodiments, the terminal also displays the virtual prop in a specified part of the master virtual object to visually show that the virtual prop is currently used, where the specified part is determined based on the type of the virtual prop. For example, when the virtual prop is a throwing prop, the corresponding designated part is the hand, that is, the throwing prop is displayed on the hand of the master virtual object. In this case, if the throwing prop is a virtual smoke bomb, it shows that the master virtual object holds the virtual smoke bomb. For another example, when the virtual prop is a shooting prop, the corresponding designated part is the shoulder, that is, the shooting prop is displayed on the shoulder of the master virtual object. In this case, if the shooting prop is a virtual firearm, it shows that the master virtual object carries the virtual firearm on the shoulder.

In some embodiments, when the prop currently used by the master virtual object is the virtual prop, at least an aiming control of the virtual prop is displayed in the virtual scenario, so that when it is detected that the user has performed a triggering operation on the aiming control of the virtual prop, the aiming picture of the virtual prop is determined based on the field of view of the master virtual object in the virtual scenario, and the aiming picture is displayed in the game client. It is to be understood that, the front sight adsorption mode in this embodiment of this application is not only suitable for shooting with opened telescope, but also applicable for shooting without opened telescope (that is, shoot from hip), so there is no specific limit as to whether the aiming picture is the aiming picture with opened telescope or the aiming picture without opened telescope.

In some embodiments, the terminal displays an aiming control and an ejection control of the virtual prop in the virtual scenario, where the aiming control is configured to enable the operation of aiming the aiming target of the projectile of the virtual prop, and the ejection control is configured to trigger the operation of triggering the projectile corresponding to the virtual prop.

In some embodiments, the terminal only displays the aiming control in the virtual scenario, and after it is detected that a triggering operation is performed on the aiming control, the aiming picture is displayed, the operation of displaying the aiming control is disabled, and the ejection control is displayed at the same time.

In some embodiments, the terminal integrates the aiming control and the ejection control into an interactive control, so that the user can press the aiming control to trigger the operation of adjusting the front sight to aim at the aiming target, and can release the aiming control (that is, stop pressing) to trigger the operation of ejecting the projectile of the virtual prop. In this case, the interactive control can be regarded as either the aiming control or the ejection control, which is not specifically limited in this embodiment of this application.

When the terminal displays the aiming picture, for the case of shooting with opened telescope, that is, the master virtual object is equipped with a sighting telescope and uses the mode of shooting with opened telescope, the FOV picture of the master virtual object (that is, the image that can be observed by the camera mounted on the master virtual object) is first determined, and then the FOV picture is enlarged based on the objective diameter and magnifying power of the sighting telescope to acquire the aiming picture.

When the terminal displays the aiming picture, for the case of shooting without opened telescope, that is, the master virtual object is not equipped with a sighting telescope, or the master virtual object is equipped with a sighting telescope but uses the mode of shooting without opened telescope, the FOV picture of the master virtual object (that is, the image that can be observed by the camera mounted on the master virtual object) is determined as the aiming picture.

In some embodiments, the terminal displays a front sight in the aiming picture, where the front sight indicates an expected landing point of the projectile corresponding to the virtual prop in the virtual scenario when the user executes the ejection operation on the virtual prop. The aiming picture is equivalent to the imaging picture acquired after projecting the virtual scenario within the field of view onto an eyepiece of the sighting telescope. Alternatively, since the eyes of the master virtual object are close to the sighting telescope, the aiming picture is also regarded as an imaging picture acquired after the virtual scenario within the field of view is magnified and projected onto the retina of the master virtual object. That is, the aiming picture is essentially an imaging picture acquired after the virtual scenario is projected onto a two-dimensional plane and finally displayed on the terminal screen, and therefore, the aiming picture can be regarded as a projection plane.

Notably, if the projectile does not collide with an obstacle during flight, then control the projectile to move from the position of the virtual prop to the landing point indicated by the front sight, and act at the landing point indicated by the front sight. If the projectile collides with an obstacle during flight, then control the projectile to act ahead of time at the position of collision with the obstacle. The action of the projectile is determined by the virtual prop. For example, when the virtual prop is a damage type prop, it will cause damage to the virtual object within the scope of action of the projectile, which is shown in the result that the virtual hit point of the virtual prop within the scope of action is deducted. For another example, when the virtual prop is a prop that blocks the field of view, it will block the visual field of the virtual object within the scope of action of the projectile, which is shown in the result that the virtual object within the scope of action is blinded for a certain period of time (that is, the action time of the projectile). The details are not specifically limited in this embodiment of this application.

In some embodiments, regarding some FPS games, in order to make it convenient for the user to perform aiming, the front sight is always displayed in the center point of the aiming picture, so that when the user adjusts the front sight, the effect that the front sight aims at different aiming targets is reflected by changing the content of the aiming picture, thereby achieving the immersive experience of following the front sight to move to select the aiming target in a real shooting scenario. For example, in the mode of shooting with opened telescope, the front sight is exactly the center point of the aiming picture, i.e., the center of the sighting telescope, and the position of the front sight relative to the sighting telescope is kept unchanged. Therefore, adjustment of the front sight as the center of the sighting telescope is actually achieved by turning the sighting telescope, at this time, the front sight is always in the center of the field of view, while the observed aiming picture will change with the rotation of the sighting telescope.

In some embodiments, regarding other FPS games or third-person shooting (TPS) games, the front sight is not fixed to the center point of the aiming picture, so that the movement of the front sight is directly displayed in the aiming picture when the user adjusts the front sight. Whether the front sight is fixed to the center point of the aiming picture is not specifically limited in this embodiment of this application. Schematically, when the front sight moves within the central region of the aiming picture, the sighting telescope is fixed, that is, the aiming picture is kept unchanged; and when the front sight moves to an edge region of the aiming picture (that is, the region other than the central region), the front sight is driven to move in the same direction to display the aiming picture outside an original lens, and make the front sight located in the central region of the new aiming picture. The central region or edge region is set by a person skilled in the art, which is not specifically limited in this embodiment of this application.

Since the front sight indicates the expected landing point of the projectile of the virtual prop, the adjustment operation on the front sight by the user essentially belongs to the aiming operation on the virtual prop. In other words, the aiming operation on the virtual prop in this embodiment of this application refers to the adjustment operation on the front sight, the adjustment operation including: displacement of the front sight (change in position), steering of the front sight (change in orientation), etc. In some embodiments, when the front sight is fixed to the center point of the aiming picture, since the position of the front sight relative to the sighting telescope is kept unchanged (that is, the front sight is always the center point of the sighting telescope), the adjustment operation on the front sight also refers to the adjustment operation on the sighting telescope, in other words, the corresponding adjustment to an aim point of the center point of the sighting telescope is driven by controlling the master virtual object to adjust the sighting telescope. In some embodiments, since the sighting telescope itself is also bound to the virtual prop, an adjustment operation on the sighting telescope can also be regarded as an adjustment operation on a camera mounted on the virtual prop. Alternatively, since the master virtual object may make observation by pressing the eyes close to the sighting telescope, an adjustment operation on the sighting telescope can also be regarded as an adjustment operation on the camera mounted on the master virtual object, which is not specifically limited in this embodiment of this application.

In some embodiments, the user may realize the adjustment operation on the front sight by any of the following methods or a combination of multiple methods: (1) The user clicks an aiming control in the virtual scenario to trigger display of the aiming picture, and then the aiming control turns into an interactive rotating disc. The user may control the front sight to make corresponding displacement by continuously pressing the aiming control and sweeping the finger. (2) The user can loose the hands after clicking the aiming control to trigger display of the aiming picture, and then a new interactive rotating disc is displayed in the aiming picture. The user may control the front sight to make corresponding displacement by continuously pressing the interactive rotating disc and sweeping the finger. (3) The user can loose the hands after clicking the aiming control to trigger display of the aiming picture, and may control the front sight to make corresponding displacement by continuously pressing any position in the aiming picture and then sweeping the finger. That is, the adjustment of the front sight can be triggered by any position in the aiming picture, which is not limited to the interactive rotating disc. (4) The user can loose the hands after clicking the aiming control to trigger display of the aiming picture. At this time, the user can rotate the terminal in any direction, so that the front sight can be controlled to make corresponding displacement after a sensor senses the rotation operation on the terminal. (5) The user can loose the hands after clicking the aiming control to trigger display of the aiming picture. The user can click on any position in the aiming picture, so that the front sight can be refocused on the clicked position. (6) The user controls the front sight to make corresponding displacement as indicated by a voice command. (7) The user controls the front sight to make corresponding displacement as indicated by a gesture command, e.g., tapping the left edge of the screen to control the left translation of the front sight, or suspending one hand above the screen (the hand does not touch the screen), and waving the hand leftward facing the camera to control the left translation of the front sight, etc. The gesture command is not specifically limited in this embodiment of this application. Notably, only some exemplary illustrations of the adjustment operation of the front sight are given herein, and the adjustment operation can also be carried out on the front sight in ways other than the above, which is not specifically limited in this embodiment of this application.

In some embodiments, after the user performs an adjustment operation on the front sight in any of the above ways, the terminal determines that the aiming operation of the virtual prop is detected, and acquires a displacement direction and a displacement velocity of the front sight performing an aiming operation in response to the aiming operation on a virtual prop.

Schematically, when the front sight is adjusted by pressing the screen and sweeping the finger according to the above methods (1)-(3), a pressure point of a pressure signal exerted by the user's finger on the terminal screen can be sensed by the pressure sensor of the terminal, and the pressure point constantly changes in the sliding process to form a sliding trajectory (also known as sliding curve); a tangential direction of the sliding trajectory at an end point at the current frame (i.e., the screen picture frame at the current moment) is determined as the displacement direction of the front sight, and the displacement velocity of the front sight is determined by the sliding velocity of the user's finger at the current frame. For example, the sliding velocity is scaled according to a first preset ratio to obtain the displacement velocity, where the first preset ratio is a value greater than 0, and is set by a person skilled in the art.

Schematically, when the front sight is adjusted by rotating the terminal according to the above method (4), the rotation direction and rotation velocity of the user's rotation operation on the terminal can be sensed using a gyroscope sensor of the terminal, where the opposite direction of the rotation direction is taken as the displacement direction of the front sight, and the displacement velocity of the front sight is determined by the rotation velocity. For example, the rotation velocity is scaled according to a second preset ratio to obtain the displacement velocity, where the second preset ratio is a value greater than 0, and is set by a person skilled in the art.

Schematically, when a position is clicked according to the above method (5) to make the front sight move to the clicked position, a half-line pointing from the current position of the front sight to the clicked position can be taken as the displacement direction of the front sight, and a preset displacement velocity is obtained, where the preset displacement velocity is a value greater than 0, and is set by a person skilled in the art.

Schematically, when the front sight is adjusted using the voice command in the above method (6) or the gesture command in the method (7), the displacement direction and the displacement velocity of the front sight are determined as indicated by the voice command or the gesture command. If the voice instruction or gesture instruction does not indicate the displacement velocity, then a preset displacement velocity is obtained. Details are not described herein.

203: The terminal acquires an adsorption correction factor associated with the displacement direction when it is determined that an aiming target is correlated with an adsorption detection range based on the displacement direction, where the aiming target corresponds to the aiming operation, and the adsorption detection range corresponds to the first virtual object.

The adsorption detection range is a spatial range or planar region which is located outside the first virtual object and includes the first virtual object. In some embodiments, the adsorption detection range is a three-dimensional spatial range centered on the object model of the first virtual object in the virtual scenario, where the object model of the first virtual object is located within the three-dimensional spatial range. In an example, the object model of the first virtual object is a capsule-shaped model, and the three-dimensional spatial range is a cuboid spatial range located outside the capsule and including the capsule. In some embodiments, the adsorption detection range is a two-dimensional planar region centered on a model projection of a first virtual object in the aiming picture, where the model projection of the first virtual object refers to a two-dimensional projection image of the object model of the first virtual object in the aiming picture. In an example, the two-dimensional planar region is a rectangular planar region that includes the model projection.

In some embodiments, since the front sight can indicate the expected landing point of the projectile of the virtual prop, and the displacement direction of the front sight represents the user's intention to control the changes in the expected landing point when the front sight is adjusted, that is, it reflects the user's intention to aim at a target near the front sight or the target in the displacement direction. In other words, it represents the aiming target under the user's aiming operation exists near the front sight or in the displacement direction. On this basis, if it is determined that the aiming target is correlated with the adsorption detection range of the first virtual object within the current field of view based on the displacement direction, it is likely that the first virtual object is the aiming target under the aiming operation. Therefore, the active adsorption logic for the front sight can be triggered.

In some embodiments, when the front sight is located outside the adsorption detection range of the first virtual object, if the displacement direction is close to the adsorption detection range, it is determined that the aiming target is correlated with the adsorption detection range of the first virtual object within the current field of view. That is, although the front sight is located outside the adsorption detection range, as long as the front sight is displaced in a direction toward the adsorption detection range, the first virtual object can be regarded as the aiming target as well, thus triggering the active adsorption logic.

In some embodiments, when the front sight is located within the adsorption detection range of the first virtual object, it is determined that the aiming target is correlated with the adsorption detection range of the first virtual object within the current field of view. That is, as long as the front sight is located within the adsorption detection range, regardless of which direction the front sight moves, it can be regarded as fine-tuning of the first virtual object as the aiming target, thereby triggering the active adsorption logic.

In some embodiments, when it is determined that the aiming target is correlated with the adsorption detection range of the first virtual object, the terminal can acquire an adsorption correction factor associated with the displacement direction. The adsorption correction factor is used to adjust the original displacement velocity of the front sight, that is, the adsorption correction factor is equivalent to the adjustment factor, which is used to adjust the original displacement velocity of the front sight under triggering of the active adsorption logic. In some embodiments, different adsorption correction factors are pre-configured for different displacement directions, so as to select a pre-configured adsorption correction factor corresponding to the displacement direction, or the adsorption correction factor is dynamically determined by the rules described in the following embodiments, and the way of obtaining the adsorption correction factor is not specifically limited in this embodiment of this application.

204: The terminal displays the movement of the front sight at a target adsorption velocity, where the target adsorption velocity is acquired after adjusting the displacement velocity by the adsorption correction factor.

In some embodiments, the "target adsorption velocity" in this embodiment of this application is a velocity vector, which includes a vector magnitude and a vector direction. In other words, the target adsorption velocity indicates not only the movement velocity of the front sight (controlled by the vector magnitude), but also the movement direction of the front sight (controlled by the vector direction).

In some embodiments, under the active adsorption logic, it is only required to adjust the vector magnitude of the target adsorption velocity without changing the vector direction, that is, it is only required to adjust the displacement velocity of the front sight without adjusting the displacement direction of the front sight. That is, the displacement velocity is adjusted only based on the adsorption correction factor to obtain the vector magnitude (i.e., velocity value) of the velocity vector, and meanwhile, the original displacement direction of the front sight is determined as the vector direction of the velocity vector. That is, an adjustment factor is applied to the original displacement velocity of the front sight without changing the displacement direction of the front sight, so that under the condition that the user's aiming intention is unchanged, the front sight can be quickly dragged to the target virtual object (that is, aiming target) by adjusting the displacement velocity.

In some embodiments, under the active adsorption logic, it is required to adjust both the vector magnitude of the target adsorption velocity, but also the vector direction of the target adsorption velocity, which is equivalent to adjusting the displacement velocity and displacement direction of the front sight at the same time. That is, the displacement velocity is adjusted based on the adsorption correction factor to obtain the vector magnitude of the velocity vector, and the displacement direction is adjusted based on the adsorption point of the front sight to obtain the vector direction of the velocity vector. This is equivalent to applying not only an adjustment factor to the original displacement velocity of the front sight, but also an adjustment angle to the original displacement direction of the front sight, so that the displacement direction and displacement velocity are finely adjusted under the condition that the overall displacement trend remains unchanged, and thus the front sight can be quickly adsorbed onto the target virtual object (i.e., the aiming target).

In some embodiments, for each frame in the displacement process of the front sight, after the displacement velocity and displacement direction of the front sight at the current frame are determined through real-time detection, the terminal adjusts the displacement velocity based on the adsorption correction factor to obtain the vector magnitude of the target adsorption velocity (i.e., the velocity vector), and then obtains the target direction from the front sight to the adsorption point; then, an initial vector can be determined based on the original displacement velocity and displacement direction, and a corrected vector can be determined based on the vector magnitude adjusted above and the target direction, and the initial vector and the corrected vector can be summed up to obtain a target vector, where the direction of the target vector is the vector direction of the target adsorption velocity (i.e., the velocity vector). Thus, a velocity vector can be uniquely determined according to the vector magnitude and vector determined above, i.e., the target adsorption velocity which represents the velocity vector of the front sight at the current frame. Since both the displacement direction and displacement velocity of the front sight have changed at the next frame, it is necessary to re-perform step 202 to step 204 to determine the velocity vector of the front sight at the next frame, and so on, which is not described in detail herein. Notably, if the displacement direction is the same as the target direction, the direction of the target vector is also made equal to the displacement direction and the target direction, that is, the displacement direction of the front sight keeps unchanged.

In some embodiments, when the displacement direction is close to the adsorption detection range, the adsorption correction factor is configured to increase the displacement velocity so as to increase the velocity at which the front sight gets close to the first virtual object and to help the front sight to quickly aim at the first virtual object; when the displacement direction is far from the adsorption detection range, the adsorption correction factor is configured to decrease the displacement velocity so as to decrease the velocity at which the front sight gets away from the first virtual object. In this way, it allows to avoid the user's misoperation caused by excessive sliding during adjustment to the front sight.

When the displacement direction is close to the adsorption detection range, and the front sight conducts uniform motion, the displacement velocity is increased based on the adsorption correction factor to obtain a modified target adsorption velocity, so that the front sight conducts uniform motion at the adsorption correction velocity greater than the original displacement velocity. Alternatively, based on the adsorption correction factor, a fixed preset accelerated velocity is applied to the displacement velocity so that the front sight performs uniform accelerated motion under the action of the preset accelerated velocity with the displacement velocity as the initial velocity. Alternatively, based on the adsorption correction factor, a variable accelerated velocity is applied to the displacement velocity so that the front sight performs variable accelerated motion under the action of the variable accelerated velocity with the displacement velocity as the initial velocity. For example, the variable accelerated velocity is negatively correlated with the third distance, and the third distance is a distance between the front sight and the corresponding adsorption point, so that the value of the variable accelerated velocity increases when the front sight is closer to the adsorption point, and decreases when the front sight is farther away from the adsorption point.

In some embodiments, when the front sight is always fixed to the center point of the aiming picture, when the front sight is controlled to move at the target adsorption velocity in the displacement direction, since the position of the front sight relative to the aiming picture is kept unchanged, therefore, the terminal needs to control the camera mounted on the master virtual object to change its orientation along with the movement of the front sight, i.e., to control the camera to move at the target adsorption velocity, thus causing changes to the aiming picture that can be observed by the camera; since the front sight is located in the center of the aiming picture, the front sight moves as the aiming picture changes, so that the front sight can finally be aligned to the adsorption point of the first virtual object after multiple frames of displacement, which allows to present on the terminal the process of synchronous movement of the aiming picture observed in the sighting telescope following the movement of the front sight.

An embodiment of this application may be formed by using any combination of all the foregoing technical solutions, and details are not described herein.

In the related technology, when aiming is conducted using a shooting prop, the position the corresponding projectile is expected to point at may be indicated by using the front sight. The player usually finds it hard to accurately focus the front sight on the aiming target when operating manually; besides, the aiming target is usually in a moving state, which requires the player to repeatedly adjust the front sight, all of these factors leading to low efficiency of human-machine interaction.

According to the method provided in this embodiment of this application, on the basis of the aiming operation originally performed by the user, if it is determined that the aiming target is correlated with the adsorption detection range of the first virtual object, it indicates that the user has the intention to aim the first virtual object. At this time, by applying an adsorption correction factor to the original displacement velocity and adjusting the displacement velocity by the adsorption correction factor, the adjusted target adsorption velocity better suits the user's aiming intention, so that the front sight can focus on the aiming target more accurately, and the efficiency of human-machine interaction is greatly improved.

Further, since the above active adsorption logic is enabled based on the aiming operation manually triggered by the user, the adsorption performance is to make fine adjustment and correction on the velocity or direction on the basis of the original aiming operation, instead of aiming at a target instantly. Therefore, the adsorption performance is natural, smooth and unobtrusive, and the trigger action is carried out along with the aiming operation, which avoids circumstances under which the front sight suddenly aims at a first virtual object when the user does not drag the finger would not occur, brings a result is closer to that achieved by the player's own operation and reduces the user perception during the process of auxiliary aiming.

Further, the displacement direction is kept unchanged or the original displacement direction is finely adjusted, which is consistent with the player's original aiming operation in terms of overall trend. Even if the player would like to control the front sight to get away from the target, the situation that the front sight is always adsorbed onto the target and can hardly be dragged would not occur, and a correction factor for getting away from the target is simply provided. Therefore, the "adsorption" mentioned in this embodiment of this application indicates dragging slows down rather than dragging can hardly be achieved. The overall adsorption process would not be independent of the player's aiming intention, and the player can use customized adsorption correction methods (such as uniform velocity correction, accelerated velocity correction, distance correction, etc.) for different weapons, which better fits the player's habit of aiming operation.

Figure 3:
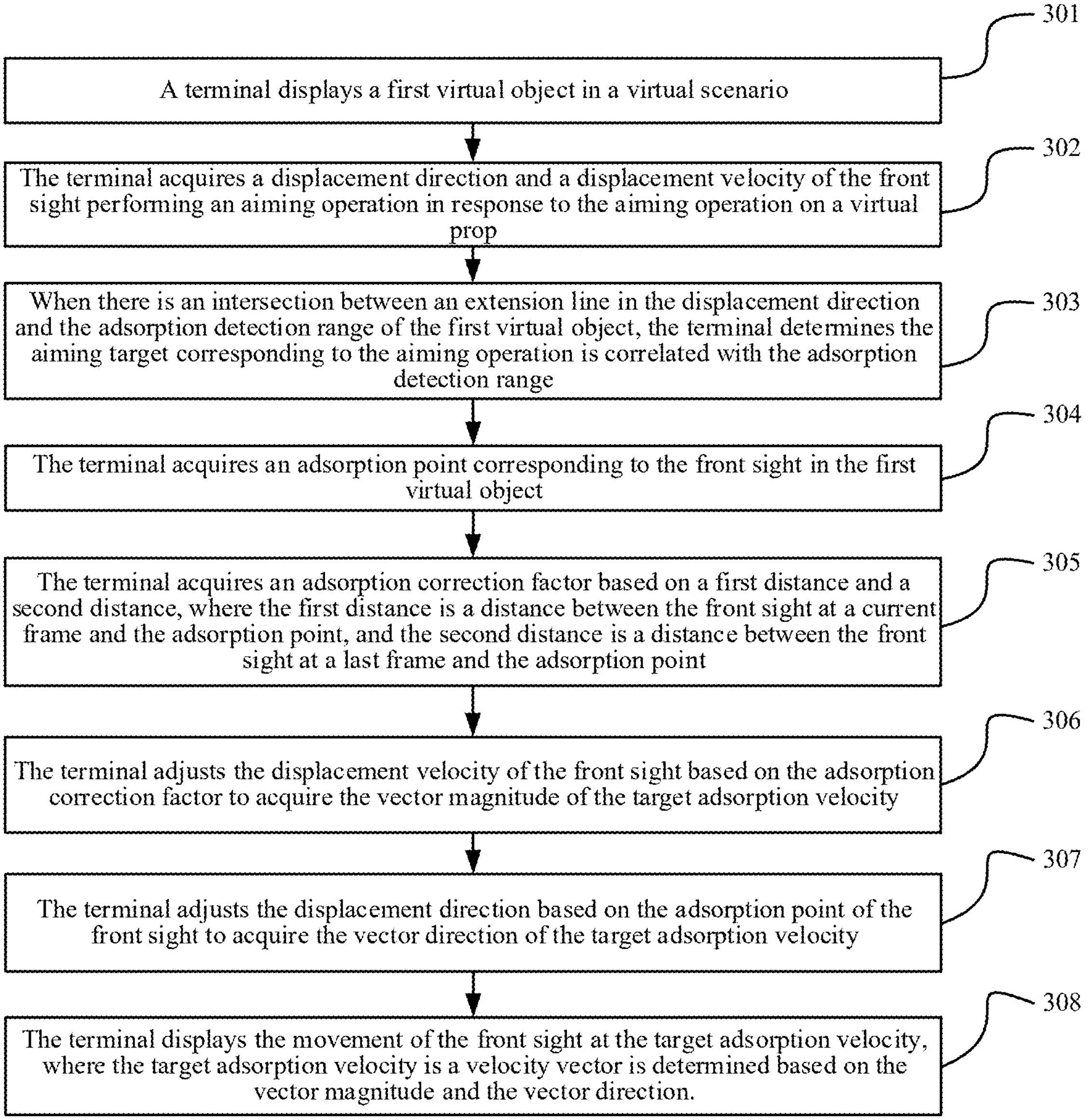
FIG. 3 is a flowchart of a method for controlling a front sight in a virtual scenario according to an embodiment of this application.

FIG. 3 is a flowchart of a method for controlling a front sight in a virtual scenario according to an embodiment of this application. Referring to FIG. 3, the embodiment is executed by an electronic device and is illustrated by using an example of an electronic device as a terminal. The embodiment includes the following steps:

301: A terminal displays a first virtual object in a virtual scenario.

The foregoing step 301 is similar to the foregoing step 201, and details are not described herein.

302: The terminal acquires a displacement direction and a displacement velocity of the front sight performing an aiming operation in response to the aiming operation on a virtual prop.

The foregoing step 303 is similar to the foregoing step 202, and details are not described herein.

303: When there is an intersection between an extension line in the displacement direction and the adsorption detection range of the first virtual object, the terminal determines the aiming target corresponding to the aiming operation is correlated with the adsorption detection range.

The adsorption detection range is a spatial range or planar region which is located outside the first virtual object and includes the first virtual object.

The existence of "an intersection" between the extension line and the adsorption detection range in this embodiment of this application means: the extension line is tangent to or intersects with the adsorption detection range (spatial range or planar region), or there is at least one coincident pixel between the determined extension line and the adsorption detection range, and the intersection between the extension line and the adsorption detection range will not be described in detail below.

In some embodiments, the adsorption detection range is a three-dimensional spatial range centered on the object model of the first virtual object in the virtual scenario, where the object model of the first virtual object is located within the three-dimensional spatial range. In an example, the object model of the first virtual object is a capsule-shaped model, and the three-dimensional spatial range is a cuboid spatial range located outside the capsule and including the capsule.

In some embodiments, the adsorption detection range is a two-dimensional planar region centered on a model projection of a first virtual object in the aiming picture, where the model projection of the first virtual object refers to a two-dimensional projection image of the object model of the first virtual object in the aiming picture. In an example, the two-dimensional planar region is a rectangular planar region that includes the model projection.

In the above embodiment, two situations where active adsorption logic can be triggered are introduced. In the first situation, the front sight is located outside the adsorption detection range, but the displacement direction is close to the adsorption detection range. In the second situation, the front sight is located within the adsorption detection range of the first virtual object (at this time, there is no need to determine the displacement direction). In this embodiment of this application, the detection of the above two situations can be combined to the same detection logic through the detection method in the foregoing step 303, that is, whether the aiming target corresponding to the aiming operation is correlated with the adsorption detection range is determined by detecting whether there is an intersection between an extension line in the displacement direction and the adsorption detection range, so as to decide whether to trigger active adsorption logic.

The principle of the above detection logic is explained as follows: when the front sight is located outside the adsorption detection range, if there is an intersection between the extension line of the front sight in the displacement direction and the adsorption detection range, it can be learned that the front sight certainly has a tendency to approach the adsorption detection range, that is, the displacement direction indicates approaching the adsorption detection range, which accords with the first situation mentioned above and triggers the active adsorption logic. When the front sight is within the adsorption detection range, whichever side the displacement direction of the front sight points to, there is certainly an intersection between a half-line that extends in any direction from any point within the adsorption detection range (representing an extension line of the front sight pointing to any displacement direction) and the adsorption detection range, which accords with the second situation mentioned above and triggers the active adsorption logic. In other words, the detection method in the foregoing step 303 makes it possible to fully detect the two situations in which active adsorption logic can be triggered in the above embodiment simply by detecting whether there is an intersection between the extension line in the displacement direction and the adsorption detection range. In this way, when there is an intersection between the extension line in the displacement direction and the adsorption detection range, it can be determined that the aiming target is correlated with the adsorption detection range, and now it can proceed to the following step 304. When there is no intersection between the extension line in the displacement direction and the adsorption detection range, it indicates that the front sight is located outside the adsorption detection range and the displacement direction is away from the first virtual object, and thus it is determined that the aiming target is not correlated with the adsorption detection range, that is, the user does not have an intention to aim at the first virtual object, and then the process ends.

The following gives a detailed description on how to determine whether there is an intersection between the extension line in the displacement direction and the adsorption detection range for two scenarios, i.e., the scenario where the adsorption detection range is a three-dimensional spatial range or the scenario where the adsorption detection range is a two-dimensional planar region.

In some embodiments, the adsorption detection range refers to a three-dimensional spatial range mounted on the first virtual object in the virtual scenario, where the wording "mount" means that the adsorption detection range moves along with the first virtual object. For example, the adsorption detection range is a detection frame mounted on an object model of the first virtual object. In addition, the shape of the three-dimensional spatial range may be consistent or inconsistent with that of the first virtual object. A cuboid spatial range is taken as an example for illustration herein, and the shape of the adsorption detection range is not specifically limited in this embodiment of this application. When the adsorption detection range is a three-dimensional spatial range, since the displacement direction of the front sight is a two-dimensional plane vector determined according to the aiming picture, the displacement direction of the front sight can be inversely projected into the virtual scenario, that is, the two-dimensional plane vector is converted into a three-dimensional direction vector, and the direction vector represents the displacement direction of the expected landing point of the projectile of the virtual prop in the virtual scenario as indicated by the front sight when the front sight moves in the displacement direction determined according to the aiming picture, where the inverse projection can be regarded as a coordinate conversion process, such as a process of converting the direction vector from the screen coordinate system to the world coordinate system. Next, since the adsorption detection range is a three-dimensional spatial range in the virtual scenario, and the direction vector is a three-dimensional vector in the virtual scenario, an extension line of the direction vector can be drawn in the virtual scenario. It is to be understood that, since the direction vector is a directed vector, the extension line is a half-line starting from an origin of the direction vector, rather than a straight line (that is, it is required to determine the extension line in the forward direction, without the need to consider the extension line in the reverse direction) Next, it is required to determine whether there is an intersection between the extension line of the direction vector and the adsorption detection range mounted on the first virtual object in the virtual scenario. The existence of an intersection means that the extension line of the direction vector passes through the adsorption detection range, or the extension line of the direction vector intersects with the adsorption detection range.

In some embodiments, the adsorption detection range is a two-dimensional planar region in which the first virtual object is nested in the aiming picture, where the two-dimensional planar region may have a shape consistent with or inconsistent with that of the first virtual object. A rectangular planar region is taken as an example for illustration herein. The shape of the adsorption detection range is not specifically limited in this embodiment of this application. When the adsorption detection range is a two-dimensional planar region, since the displacement direction of the front sight itself is a two-dimensional plane vector in the same aiming picture, and the aiming picture itself contains a two-dimensional projection image of the first virtual object in the virtual scenario, no additional processing is required. It is only required to determine the extension line (it only refers to the extension line in the forward direction herein) of the plane vector in the displacement direction in the aiming picture, and then determine whether there is an intersection between the extension line and the two-dimensional planar region, where the existence of the intersection means that the extension line of the plane vector intersects with the boundary of the two-dimensional planar region, or the extension line of the plane vector passes through the two-dimensional planar region.

Figure 4:
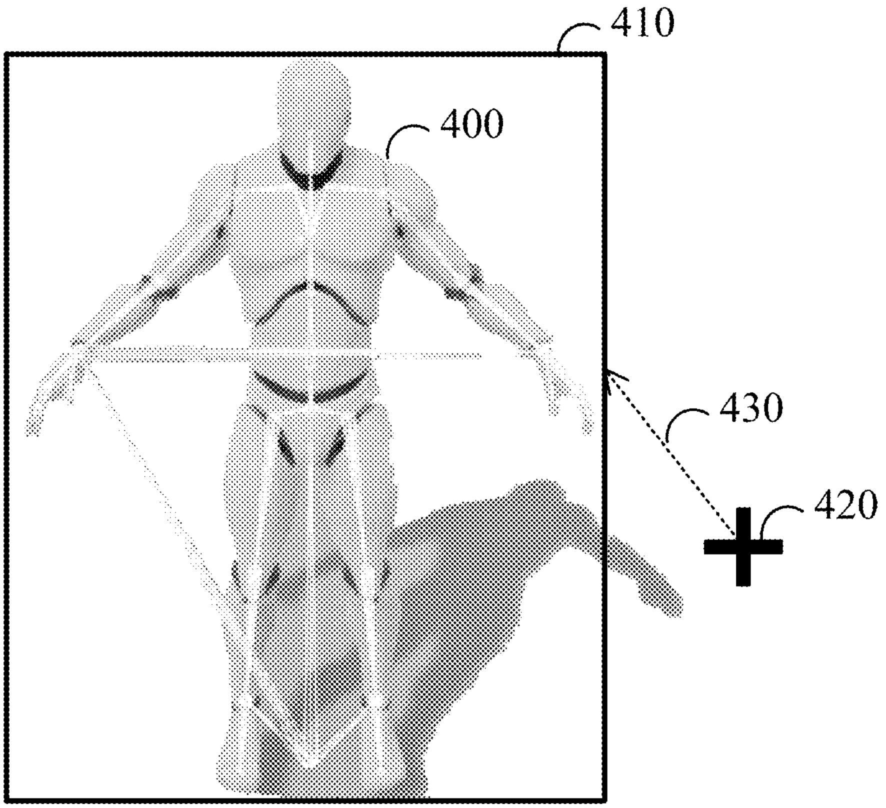
FIG. 4 is a principle diagram of an adsorption detection mode according to an embodiment of this application.

FIG. 4 is a principle diagram of an adsorption detection mode according to an embodiment of this application. As shown in FIG. 4, in an exemplary scenario, the adsorption detection range being a two-dimensional planar region is taken as an example for illustration, and the aiming picture includes a first virtual object 400 which has a corresponding adsorption detection range 410, where the adsorption detection range 410 is also known as an adsorption frame or an adsorption detection frame of the first virtual object 400. An extension line 430 is drawn in the displacement direction of the front sight 420, and when there is an intersection between the extension line 430 and the adsorption detection range 410, e.g., the extension line 430 intersects with the boundary of the adsorption detection range 410, it is determined that the aiming target is correlated with the adsorption detection range. Then proceed to the following step 304. When there is no intersection between the extension line 430 and the adsorption detection range 410, it is determined that there is no correlation between the aiming target and the adsorption detection range. Then withdraw from the process.

304: The terminal acquires an adsorption point corresponding to the front sight in the first virtual object.

When it is determined through the foregoing step 303 that the aiming target corresponding to the aiming operation is correlated with the adsorption detection range of the first virtual object, it represents that the user has the aiming intention to aim at the first virtual object as the aiming target, so the terminal can perform steps 304-305 to acquire the adsorption correction factor associated with the displacement direction.

When the adsorption correction factor is acquired, whether to adsorb the front sight to the head of the first virtual object or the body of the first virtual object can be determined based on the horizontal height of the front sight. The horizontal height refers to a height difference between the front sight and the horizon line.

In some embodiments, the head and body of the first virtual object are divided by taking a shoulder line of the first virtual object as a target dividing line. Since the target dividing line is configured to distinguish the head and the body of the first virtual object, regarding an object model of the first virtual object, the part of the model over the target dividing line is the head, and the model part under the target dividing line is the body.

Then, the horizontal height of the front sight is compared with that of the target dividing line. In some embodiments, when the horizontal height of the front sight is greater than or equal to that of the target dividing line, the terminal determines the head skeleton point of the first virtual object as the adsorption point, where the head skeleton point refers to a skeleton socket mounted on the head of the model of the first virtual object, and is configured by a person skilled in the art. For example, the head skeleton point is a lowest point of the lower mandible of the first virtual object, or the head skeleton point is a center point of the head of the first virtual object. The head skeleton point is not specifically limited in this embodiment of this application. In some embodiments, when the horizontal height of the front sight is less than the horizontal height of a target dividing line, the terminal determines the somatic skeleton point of the first virtual object as the adsorption point, where the somatic skeleton point refers to a skeleton socket mounted on a model body (such as the spine) of the first virtual object. Schematically, a plurality of preset skeleton sockets are mounted on the spine (these skeleton sockets vary in horizontal height), and a skeleton socket having a horizontal height nearest to that of the front sight is selected from the plurality of skeleton sockets as the somatic skeleton point. Schematically, each of positions on the spine can be sampled as the somatic skeleton point. At this time, sampling is carried out on the vertical central axis of the first virtual object, and the skeleton point on the vertical central axis which has the same horizontal height as the front sight is sampled as the somatic skeleton point. At this time, the somatic skeleton point is the skeleton point on the vertical central axis of the first virtual object which has the same horizontal height as the front sight.

Figure 5:
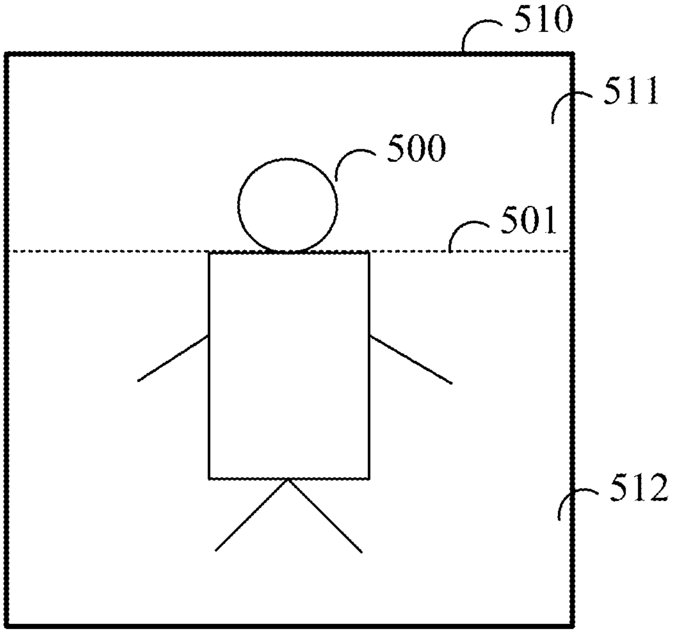
FIG. 5 is a principle diagram of an object model of a target virtual object according to an embodiment of this application.

FIG. 5 is a principle diagram of an object model of a first virtual object according to an embodiment of this application. As shown in FIG. 5, an object model 500 of the first virtual object is included. At this time, the object model 500 corresponds to a rectangular adsorption detection range 510, where the adsorption detection range 510 is also known as an adsorption frame or an adsorption detection frame of the first virtual object. The shoulder line of the object model 500 is regarded as the target dividing line 501 which can divide the first virtual object into the head and the body, where the part of the object model 500 above the target dividing line 501 is the head, and the part below the target dividing line 501 is the body. Further, the adsorption detection range 510 is also divided into a head adsorption region 511 and a body adsorption region 512 by a target dividing line 501. When the horizontal height of the front sight is greater than or equal to the horizontal height of the target dividing line 501, the front sight is adsorbed onto a preset head skeleton point in the head adsorption region 511, and when the horizontal height of the front sight is less than the horizontal height of the target dividing line 501, the front sight is adsorbed onto the somatic skeleton point having the same horizontal height as the front sight in the body adsorption region 512.

In the above process, based on the horizontal height of the front sight, an adsorption point that is matched with the front sight in horizontal height is determined from the skeleton socket mounted on the object model of the first virtual object, so that the operation of adsorbing the front sight can be smoother and more natural. Besides, when there is no adsorption point separately set for the head, and each adsorption point is determined from the adsorption points with the same height as the front sight from the vertical central axis, the situation may occur that the horizontal height of the front sight exceeds the top of the object model, and thus the adsorption point of the front sight goes beyond the object model, which leads to an incongruous and unnatural adsorption effect. Therefore, by using the logic of setting different adsorption points on the head and body, the fluency and naturalness of adsorbing the front sight can be improved.

In other embodiments, another method of acquiring an adsorption point corresponding to the front sight is provided: if the extension line of the front sight in the displacement direction intersects with the vertical central axis of the first virtual object, the intersection point of the extension line and the vertical central axis is determined as the adsorption point. If the extension line of the front sight in the displacement direction does not intersect with the vertical central axis of the first virtual object, proceed to the processing logic of determining the adsorption point according to the horizontal height of the front sight.

305: The terminal acquires an adsorption correction factor based on a first distance and a second distance, where the first distance is a distance between the front sight at a current frame and the adsorption point, and the second distance is a distance between the front sight at a last frame and the adsorption point.

When the adsorption point is determined, the terminal acquires the distance (i.e., first distance) between the front sight at a current frame (i.e., the screen picture frame at the current moment) and the adsorption point, and acquires the distance (i.e., second distance) between the front sight at a last frame of the current frame and the adsorption point. For example, the terminal calculates the distance between the front sight and the adsorption point frame by frame, thereby obtaining the first distance corresponding to the current frame and the second distance corresponding to the last frame.

In some embodiments, when the adsorption point is the head skeleton point, the terminal directly acquires a linear distance between position coordinates of the front sight and position coordinates of the head skeleton point, where the linear distance between the two points is the distance d between the front sight and the adsorption point, where d=distance (front sight, head skeleton point), d representing a distance between the front sight and the adsorption point, and "distance" representing the process of solving the linear distance between the two points in parentheses. The terminal calculates the linear distance between the front sight and the head skeleton point for the current frame and the last frame, respectively.

In some embodiments, when the adsorption point is a somatic skeleton point, the linear distance between the above two points can also be used as the distance between the front sight and the adsorption point. The way to acquire this distance is not described herein. In this case, another way to obtain the distance between the front sight and the adsorption point is also referred to, that is, to determine the offset between the front sight and the adsorption point in the horizontal axis and the offset between the front sight and the adsorption point in the vertical axis regarding the current frame and the last frame, where the larger offset is determined as the distance between the front sight and the adsorption point.

In other words, the terminal acquires the lateral offset and the longitudinal offset from the front sight to the first virtual object, where the lateral offset refers to the distance between the front sight and the vertical central axis of the first virtual object, that is, an absolute value of the difference between a horizontal coordinate of the front sight and a horizontal coordinate of the vertical central axis is determined as the lateral offset; and the longitudinal offset refers to the distance between the front sight and the horizontal central axis of the first virtual object, that is, an absolute value of the difference between a vertical coordinate of the front sight and a vertical coordinate of the horizontal central axis is determined as the longitudinal offset; then the terminal compares the magnitudes of lateral offset and the longitudinal offset; and determines the maximum value in the lateral offset and the longitudinal offset as the distance between the front sight and the adsorption point. In one example, the X coordinate represents a horizontal coordinate (i.e., transverse coordinate), assuming that the lateral offset is greater than the longitudinal offset, the lateral offset is the maximum value in the lateral offset and the longitudinal offset, and at this time, d=Abs (X coordinate of vertical central axis-X coordinate of front sight), d representing a distance between the front sight and the adsorption point, Abs representing an absolute value of the values in parentheses.

In the above process, since the head skeleton point is usually fixed, whether the front sight is close to or away from the adsorption point can be precisely shown by using the linear distance between two points; whereas, the somatic skeleton point changes dynamically with the horizontal height of the front sight, therefore, when both the front sight and the adsorption point (somatic skeleton point) change, if the linear distance between the two points is still used as the judgment criterion for the distance between the front sight and the adsorption point, it will decrease the accuracy of judging whether the front sight is close to or away from the adsorption point, and further decrease the accuracy of the configuring the adsorption correction factor. In view of this problem, the lateral offset and longitudinal offset are calculated, and the larger offset of two offsets is determined as the distance between the front sight and the adsorption point, so that whether the front sight and the adsorption point are close to or away from each other along the fast-moving axis can be finely determined, thereby precisely configuring the adsorption correction factor.

In some embodiments, for the current frame, the first distance d between the front sight and the adsorption point is obtained according to the above method; and for the last frame, the second distance dLastFrame between the front sight and the adsorption point is also obtained according to the above method. If the first distance is less than the second distance, that is, d<dLastFrame, the following step 305-1 is executed to determine the first correction factor as the adsorption correction factor. If the first distance is greater than or equal to the second distance, that is, d≥dLastFrame, the following step 305-2 is executed to determine the second correction factor as the adsorption correction factor.

305-1: When the first distance is less than the second distance, the terminal determines a first correction factor as an adsorption correction factor.

In the above process, when the first distance is less than the second distance, it indicates that the front sight is gradually close to the adsorption point on the first virtual object, and it is required to increase the displacement velocity to adsorb the front sight more quickly to the adsorption point. Therefore, the first correction factor can be determined as the adsorption correction factor, where the first correction factor is used to increase the displacement velocity of the front sight, and is also known as acceleration correction factor, proximity correction factor, etc., which is not specifically limited in this embodiment of this application.

In some embodiments, the terminal performs the following steps (1) to (3) when acquiring the first correction factor:

(1) The terminal determines an adsorption acceleration intensity based on the displacement direction, where the adsorption acceleration intensity characterizes the degree to which the displacement velocity is increased.

In some embodiments, the adsorption acceleration intensity at this time may be selected from the pre-configured acceleration intensity by judging whether the extension line in the displacement direction (that is, the extension line in the forward direction) intersects with the central axis of the first virtual object. In some embodiments, a person skilled in the art pre-configures the first acceleration intensity Adsorption1 and the second acceleration intensity Adsorption2 on the server side, where the first acceleration intensity Adsorption1 and the second acceleration intensity Adsorption2 are values greater than 0. In addition, a person skilled in the art may configure more or less acceleration intensity based on the service requirements, which is not specifically limited in this embodiment of this application.

In an exemplary scenario, assuming the second acceleration intensity Adsorption2 is less than the first acceleration intensity Adsorption1, when the extension line intersects with the central axis of the first virtual object, it shows that there is a strong aiming intention to aim at the first virtual object, and therefore, the greater first acceleration intensity Adsorption1 is determined as the adsorption acceleration intensity; and when the extension line does not intersect with the central axis of the first virtual object, it shows that there is a weak aiming intention to aim at the first virtual object, and therefore, the less second acceleration intensity Adsorption2 is determined as the adsorption acceleration intensity.

In some embodiments, since the first virtual object actually includes a horizontal central axis and a vertical central axis, whether the extension line intersects with the central axis of the first virtual object can be determined by judging whether the extension line intersects with any of the horizontal central axis or the vertical central axis: when the extension line intersects with the horizontal central axis or the central vertical central axis, or both the horizontal central axis and the vertical central axis, it is determined that the extension line intersects with the central axis of the first virtual object; and when the extension line intersects with neither of the horizontal central axis and the vertical central axis, it is determined that the extension line does not intersect with the central axis of the first virtual object. In some embodiments, it is also possible to merely determine whether the extension line intersects with the vertical central axis, or merely determine whether the extension line intersects with the horizontal central axis, which is not specifically limited in this embodiment of this application.

Figure 6:
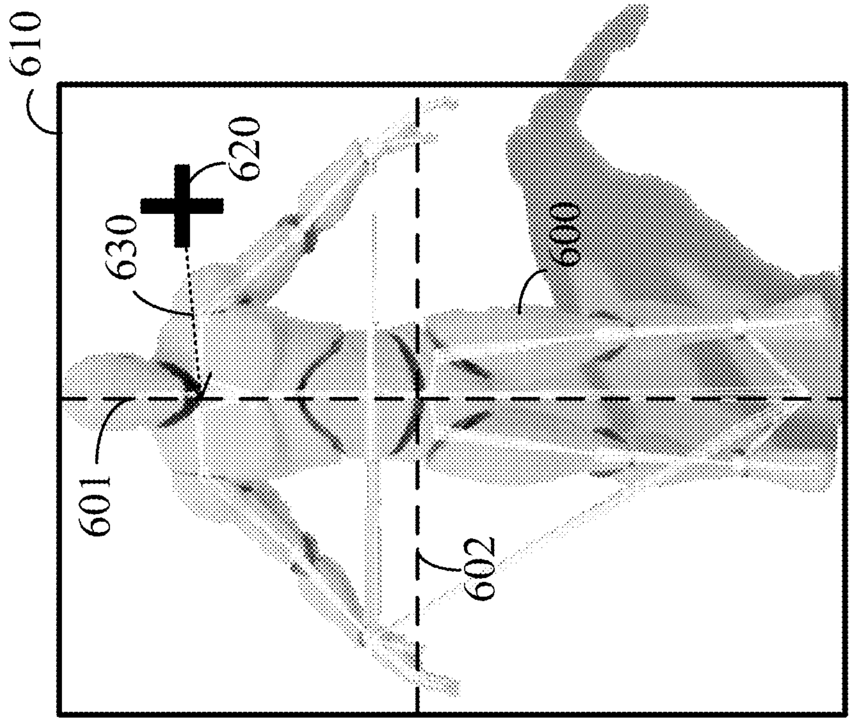
FIG. 6 is a principle diagram of an object model of a target virtual object according to an embodiment of this application.

FIG. 6 is a principle diagram of an object model of a first virtual object according to an embodiment of this application. As shown in FIG. 6, an object model 600 of the first virtual object is externally provided with a rectangular adsorption detection range 610, and the first virtual object has a vertical central axis 601 and a horizontal central axis 602. Assuming that the front sight 620 at the current frame is located inside the adsorption detection range 610, an extension line 630 is drawn in the displacement direction of the front sight 620, at this time, the extension line 630 intersects with the vertical central axis 601 of the first virtual object, and therefore, the larger first acceleration intensity Adsorption1 is determined as the adsorption acceleration intensity.

Figure 7:
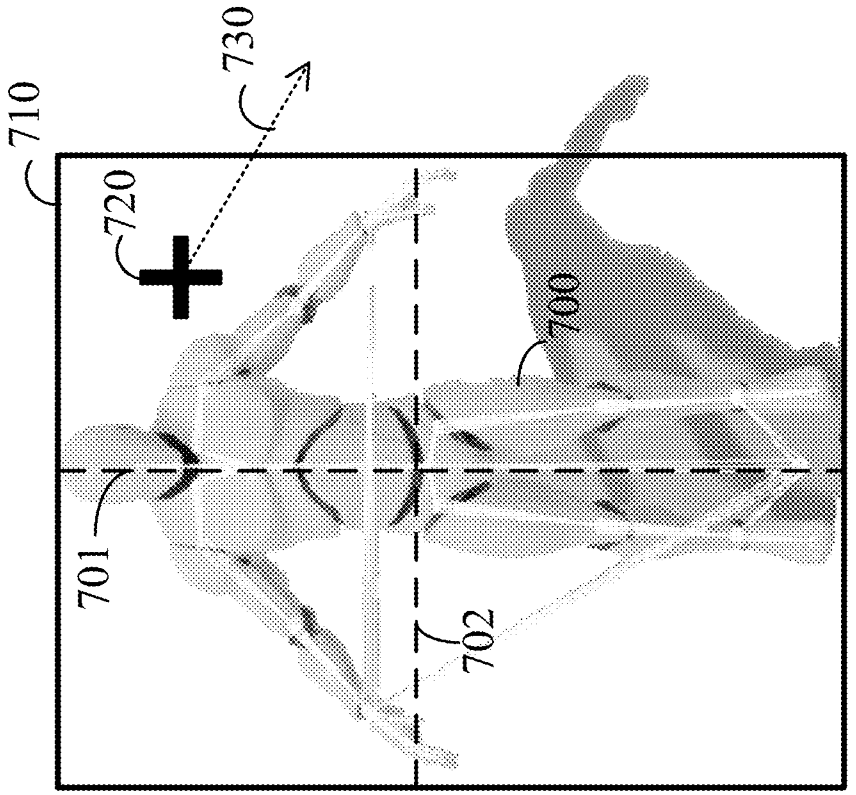
FIG. 7 is a principle diagram of an object model of a target virtual object according to an embodiment of this application.

FIG. 7 is a principle diagram of an object model of a first virtual object according to an embodiment of this application. As shown in FIG. 7, an object model 700 of the first virtual object is externally provided with a rectangular adsorption detection range 710, and the first virtual object has a vertical central axis 701 and a horizontal central axis 702. Assuming that the front sight 720 at the current frame is located inside the adsorption detection range 710, an extension line 730 is drawn in the displacement direction of the front sight 720, and at this time, the extension line 730 intersects with neither of the vertical central axis 701 and the horizontal central axis 702 of the first virtual object. Notably, both the horizontal central axis 701 and the vertical central axis 702 stop at the boundary of the adsorption detection range 710 and would not extend infinitely in the aiming picture. That is to say, both the horizontal central axis 701 and the vertical central axis 702 stop extending at the boundary of the adsorption detection range 710, and therefore, the less second acceleration intensity Adsorption2 is determined as the adsorption acceleration intensity.

In the above process, different adsorption acceleration intensities are selected depending on different conditions, so that the adsorption acceleration intensity better fits the user's aiming intention to aim at the first virtual object, thereby achieving a more natural and smoother adsorption effect.

(2) The terminal acquires an adsorption acceleration type corresponding to the virtual prop, where the adsorption acceleration type characterizes a manner in which the displacement velocity is increased.

In some embodiments, a person skilled in the art configures default adsorption acceleration types under different default situations for different virtual props on the server side. In some embodiments, if the user does not set the adsorption acceleration type at the terminal, the default adsorption acceleration type under the default situation corresponding to the virtual prop is determined; if the user customizes the adsorption acceleration type at the terminal, then the adsorption acceleration type generated after the virtual prop is customized by the user is determined. The way to acquire the adsorption acceleration type is not specifically limited in this embodiment of this application.

In some embodiments, the terminal performs associative storage on the identification (ID) of the virtual prop and the corresponding adsorption acceleration type K. At this time, if the user does not set the adsorption acceleration type, then the adsorption deceleration type K under the default situation is stored in association with the ID of each virtual prop; and if the user customizes the adsorption acceleration type K corresponding to any virtual prop, the adsorption acceleration type K stored in association with the ID of the virtual prop is modified in cache. Then, the adsorption acceleration type K can be queried simply based on the ID of the currently used virtual prop, where the ID is taken as an index stored in association with the adsorption acceleration type K.

In some embodiments, the adsorption acceleration type K includes at least one of the following: a uniform velocity correction type K1 configured to increase the displacement velocity; an accelerated velocity correction type K2 configured to preset an accelerated velocity for the displacement velocity; and a distance correction type K3 configured to set a variable accelerated velocity for the displacement velocity, where the variable accelerated velocity is negatively correlated with a third distance, and the third distance is a distance between the front sight and the adsorption point.

In some embodiments, with the above uniform velocity correction type K1, the displacement velocity modified by the adsorption acceleration intensity is scaled in a proportion of K1 on the basis of acceleration with the adsorption acceleration intensity, so that the displacement velocity is directly increased, which is equivalent to making the front sight perform uniform motion at a higher velocity. K1 is greater than 1.

In some embodiments, with the above accelerated velocity correction type K2, a preset accelerated velocity K2 is applied to the displacement velocity modified by the adsorption acceleration intensity on the basis of acceleration with the adsorption acceleration intensity, so that a fixed accelerated velocity is applied to the displacement velocity, which is equivalent to making the front sight perform uniform accelerated motion under the action of the preset accelerated velocity.

In some embodiments, with the distance correction type K3, a variable accelerated velocity K3 changing with the distance is applied to the displacement velocity modified by the adsorption acceleration intensity on the basis of acceleration with the adsorption acceleration intensity, so that a variable accelerated velocity changing with the distance between the front sight and the adsorption point is applied to the displacement velocity, which is equivalent to making the front sight perform variable accelerated motion under the action of the variable accelerated velocity. For example, the variable accelerated velocity is negatively correlated with the distance between the front sight and the adsorption point, so that the value of the variable accelerated velocity increases when the front sight is closer to the adsorption point, and decreases when the front sight is farther away from the adsorption point.

In the above process, by configuring a variety of adsorption acceleration types for different virtual props, and supporting the user's personalized setting of the adsorption acceleration type, the user can set the best adsorption acceleration type achieving the best personal hand feeling for different virtual props, so as to optimize the adsorption effect and improve the user experience.

(3) The terminal determines the first correction factor based on the adsorption acceleration intensity and the adsorption acceleration type.

In some embodiments, the terminal blends the adsorption acceleration intensity and the adsorption acceleration type to acquire the first correction factor. For example, the first correction factor is obtained by multiplying the adsorption acceleration intensity Adsorption with the adsorption acceleration type K, which is expressed as follows: the first correction factor=Adsorption K. In one example, the adsorption acceleration intensity Adsorption is flexibly configured according to the displacement direction of the front sight, with a value of Adsorption1 or Adsorption2; and the adsorption acceleration type K is flexibly configured according to the default settings or user personalization settings of the virtual prop currently used, with a value of K1, K2 or K3; where the adsorption acceleration intensity Adsorption is equivalent to a basic acceleration factor, and the adsorption acceleration type K is equivalent to a regulating factor.

In some embodiments, the terminal may alternatively only perform the foregoing step (1) and directly determine the adsorption acceleration intensity Adsorption as the first correction factor, or only perform the foregoing step (2) and determine the adsorption acceleration type K as the first correction factor, which is not specifically limited in this embodiment of this application.

305-2: When the first distance is greater than or equal to the second distance, the terminal determines the second correction factor as the adsorption correction factor.

In the above process, when the first distance is greater than or equal to the second distance, it indicates that the front sight is gradually away from the adsorption point on the first virtual object, and it is required to decrease the displacement velocity to provide some resistance to avoid user's misoperation or excessive sliding on the screen. Therefore, the second correction factor can be determined as the adsorption correction factor, where the second correction factor is used to reduce the displacement velocity of the front sight, and is also known as deceleration correction factor, separating correction factor, etc., which is not specifically limited in this embodiment of this application.

In some embodiments, when acquiring the second correction factor, the terminal can first determine a correction factor curve, where the transverse coordinate of the correction factor curve indicates the relative displacement between the front sight and the adsorption point between two adjacent frames, the relative displacement represents the distance difference between the front sight and the adsorption point between the two adjacent frames, and the vertical coordinate of the correction factor curve indicates the value of the second correction factor. Thus, after the first distance and the second distance are acquired, the second correction factor can be sampled from the correction factor curve based on the distance difference between the first distance and the second distance.

Figure 8:
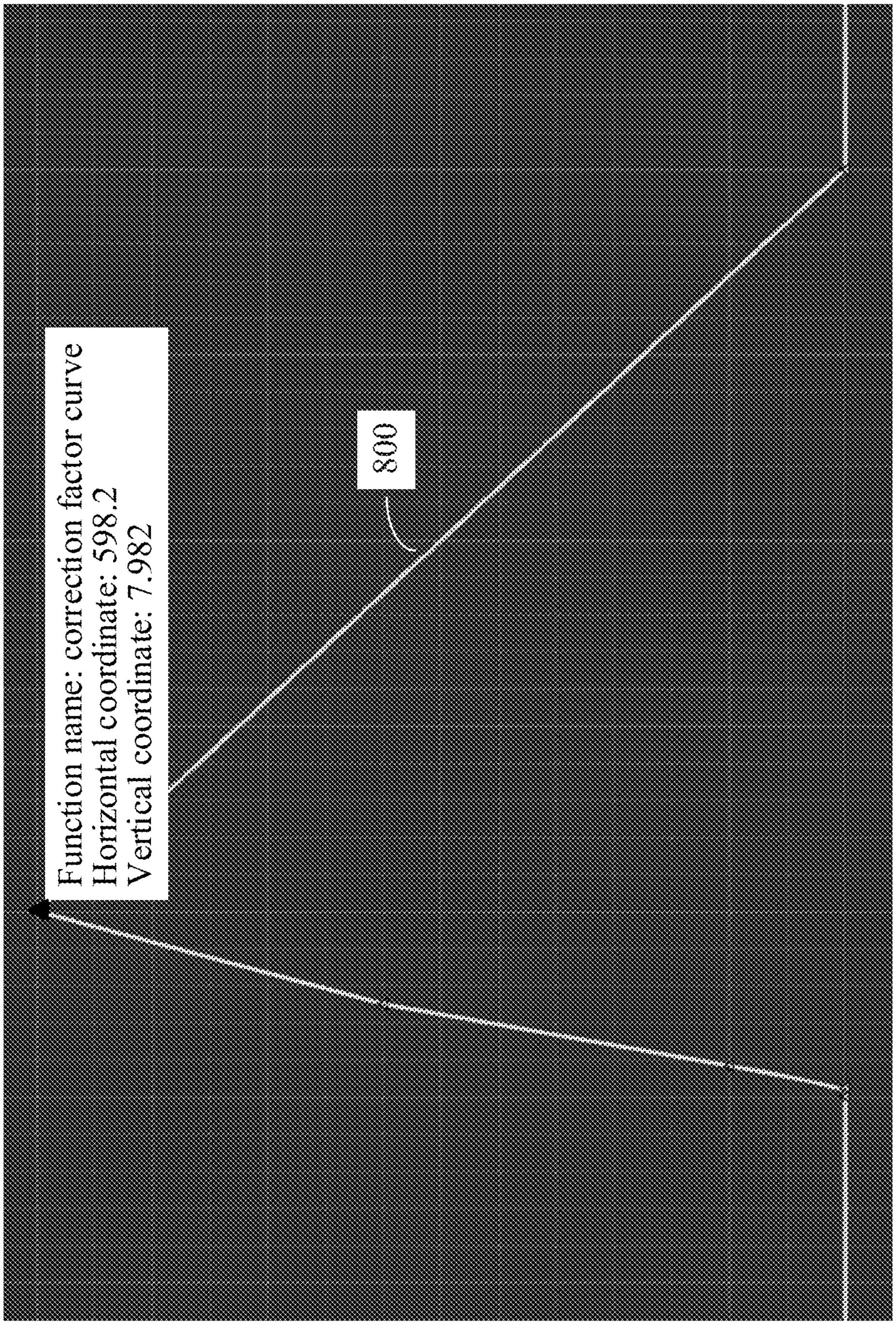
FIG. 8 is a principle diagram of a correction factor curve according to an embodiment of this application.

FIG. 8 is a principle diagram of a correction factor curve according to an embodiment of this application. As shown in FIG. 8, the distance between the front sight at the current frame and the adsorption point is taken as the transverse coordinate, and then the vertical coordinate is calculated by substituting the transverse coordinate into the correction factor curve 800, thus obtaining the value of the second correction factor at the current frame.

Schematically, factorAwayMin represents the second correction factor; PC→RotationInputCache. Yaw represents the relative displacement (i.e., the distance difference between the first distance and the second distance) between the front sight and the adsorption point at the current frame and the last frame; function FMath::Abs( ) represents an absolute value of values in parentheses; function LockDegressFactorAwayMid→GetFloatValue( ) represents the operation of substituting the values in parentheses into the transverse coordinate of the correction factor curve LockDegressFactorAwayMid to calculate the corresponding vertical coordinate. Therefore, the above process of sampling the correction factor curve to obtain the second correction factor can be expressed by the following code:

```
factorAwayMin=LockDegressFactorAwayMid→Get-
  FloatValue(FMath::Abs(PC→RotationInput-
  Cache.Yaw)).
```

306: The terminal adjusts the displacement velocity of the front sight based on the adsorption correction factor to acquire the vector magnitude of the target adsorption velocity.

In some embodiments, the "target adsorption velocity" in this embodiment of this application is a velocity vector, which includes a vector magnitude and a vector direction. The target adsorption velocity indicates not only the movement velocity of the front sight (controlled by the vector magnitude), but also the movement direction of the front sight (controlled by the vector direction).

In some embodiments, under the active adsorption logic, the target adsorption velocity is obtained by adjusting the displacement velocity by the adsorption correction factor, and it is only required to adjust the vector magnitude of the target adsorption velocity rather than the vector direction. That is, the displacement velocity is adjusted only based on the adsorption correction factor to obtain the vector magnitude of the velocity vector (that is, the velocity value), and meanwhile, the original displacement direction of the front sight is directly determined as the vector direction of the velocity vector. Skip step 307 and directly perform step 308. That is, an adjustment factor is applied to the original displacement velocity of the front sight without changing the displacement direction of the front sight, so that under the condition that the user's aiming intention is unchanged, the front sight can be quickly dragged to the target virtual object (that is, aiming target) by adjusting the displacement velocity.

In some embodiments, the terminal adjusts the displacement velocity based on the adsorption correction factor to acquire the target adsorption velocity. When the distance between the front sight at the current frame and the adsorption point is less than the distance between the front sight at the last frame and the adsorption point, it shows that the displacement direction of the front sight is close to the adsorption detection range, and the displacement velocity is increased by using the first correction factor obtained in step 305-1 above, so as to increase the velocity at which the front sight gets close to the first virtual object and to help the front sight to quickly aim at the first virtual object; when the distance between the front sight at the current frame and the adsorption point is greater than or equal to the distance between the front sight at the last frame and the adsorption point, it indicates that the displacement direction of the front sight is far from the adsorption detection range, and the displacement velocity is decreased by using the second correction factor obtained in step 305-2 above, so as to decrease the velocity of the front sight away from the first virtual object. In this way, it allows to avoid the user's misoperation caused by excessive sliding during adjustment to the front sight.

307: The terminal adjusts the displacement direction based on the adsorption point of the front sight to acquire the vector direction of the target adsorption velocity.

In this embodiment of this application, under the active adsorption logic, not only the vector magnitude of the target adsorption velocity is adjusted, but also the vector direction of the target adsorption velocity is adjusted. That is, the displacement velocity is adjusted based on the adsorption correction factor to obtain the vector magnitude (i.e., velocity value) of the velocity vector, and the displacement direction is adjusted based on the adsorption point of the front sight to obtain the vector direction of the velocity vector. This is equivalent to applying not only an adjustment factor to the original displacement velocity of the front sight, but also an adjustment angle to the original displacement direction of the front sight, so that the displacement direction and displacement velocity are finely adjusted under the condition that the overall displacement trend remains unchanged, and thus the front sight can be quickly adsorbed onto the first virtual object (i.e., the aiming target).

In some embodiments, for each frame in the displacement process of the front sight, after the displacement velocity and displacement direction of the front sight at the current frame are determined through real-time detection, the terminal adjusts the displacement velocity based on the adsorption correction factor according to the foregoing step 306 to obtain the vector magnitude of the target adsorption velocity (i.e., velocity vector), and then obtains the target direction from the front sight to the adsorption point according to the step 307; then, an initial vector can be determined based on the original displacement velocity and displacement direction, and a modified vector can be determined based on the magnitude of the above adjusted vector and the target direction, and the initial vector and the modified vector can be summed up to obtain a target vector, where the direction of the target vector is the vector direction of the target adsorption velocity (i.e., the velocity vector). Thus, a velocity vector can be uniquely determined according to the vector magnitude and vector direction determined above, i.e., the target adsorption velocity which represents the velocity vector of the front sight at the current frame. Since both the displacement direction and displacement velocity of the front sight have changed at the next frame, it is necessary to re-perform step 302 to step 307 to determine the velocity vector of the front sight at the next frame, and so on, which is not described in detail herein. Notably, if the displacement direction is the same as the target direction, the direction of the target vector is also made equal to the displacement direction and the target direction, that is, the displacement direction of the front sight keeps unchanged.

308: The terminal displays the movement of the front sight at the target adsorption velocity, where the target adsorption velocity is a velocity vector is determined based on the vector magnitude and the vector direction.

In some embodiments, when the front sight is not fixed to the center point of the aiming picture, the movement of the front sight in the displacement direction and at the target adsorption velocity adjusted by the adsorption correction factor is directly displayed in the aiming picture.

In other embodiments, when the front sight is always fixed to the center point of the aiming picture, when the front sight is controlled to move at the target adsorption velocity in the displacement direction, since the position of the front sight relative to the aiming picture is kept unchanged, therefore, the terminal needs to control the camera mounted on the master virtual object to change its orientation along with the movement of the front sight, i.e., to control the camera to move at the target adsorption velocity, thus causing changes to the aiming picture that can be observed by the camera; since the front sight is located in the center of the aiming picture, the front sight moves as the aiming picture changes, so that the front sight can finally be aligned to the adsorption point of the first virtual object after multiple frames of displacement, which allows to present on the terminal the process of synchronous movement of the aiming picture observed in the sight following the movement of the front sight.

Figure 9:
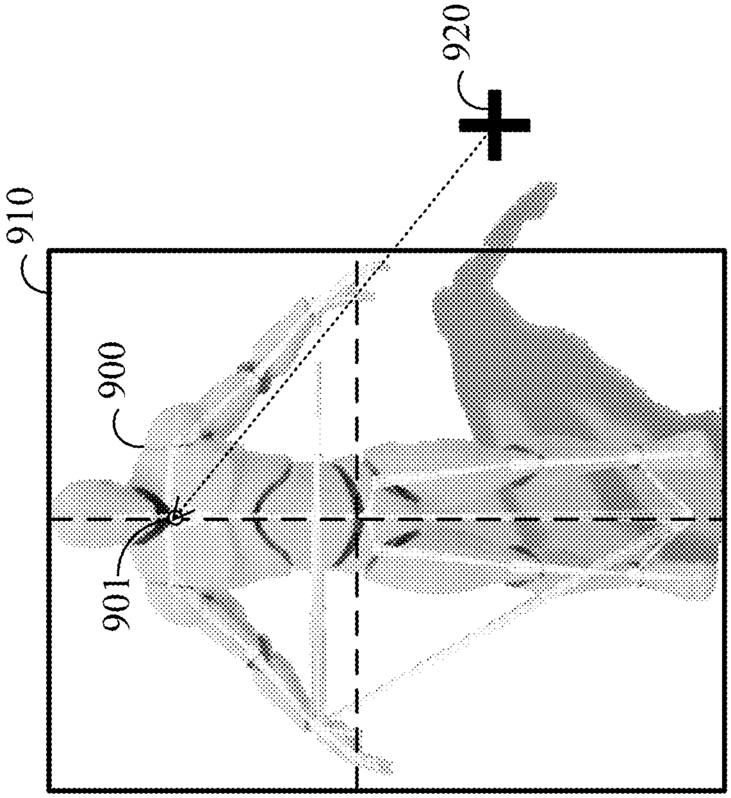
FIG. 9 is a principle diagram of an active adsorption mode according to an embodiment of this application.

FIG. 9 is a principle diagram of an active adsorption mode according to an embodiment of this application. As shown in FIG. 9, the active adsorption logic of the front sight is triggered when it is determined that the aiming target is correlated with the adsorption detection range 910 of the first virtual object 900 based on the method in the foregoing step 303, where the active adsorption logic means: the front sight 920 is gradually adsorbed onto an adsorption point 901 matched with a displacement direction in the displacement direction indicated by the user. Reference can be made to the description of the foregoing step 304 for the way to acquire the adsorption point 901. By way of example, the adsorption point 901 is taken as the intersection of the extension line of the front sight 920 in the displacement direction and the vertical central axis of the first virtual object 900 for illustration, and schematically, the intersection is exactly the head skeleton point of the first virtual object 900. In addition, under the active adsorption logic, the corresponding adsorption correction factor is determined based on the foregoing step 305. Since the displacement direction of the front sight 920 is close to the adsorption detection range 910, the first correction factor involved in the foregoing step 305-1 is used as the adsorption correction factor to increase the original displacement velocity of the front sight 920 to a certain extent, thereby increasing the velocity at which the front sight 920 is adsorbed onto the adsorption point 901.

In some embodiments, a possible invalid condition is provided for the active adsorption mode, that is, when the user moves the front sight from the inside of the adsorption detection range of the first virtual object to the outside of the adsorption detection range for a first duration, the operation of performing active adsorption logic on the front sight is canceled, where the first duration is any duration greater than 0, such as 0.5 second, 0.3 second, etc. That is to say, since the user's aiming operation on the virtual prop is a real-time and dynamic process, the displacement velocity at the current moment is adjusted based on the latest and real-time adsorption correction factor for each frame. On this basis, when the front sight moves from the inside of the adsorption detection range to the outside of the adsorption detection range, and the duration for which the front sight remains outside the adsorption detection range exceeds the first duration, the terminal skips adjusting the displacement velocity by the adsorption correction factor. At this time, there is no need to adjust the displacement velocity, and it is only required to control the front sight to move at the displacement velocity at the current moment in the displacement direction at the current moment. The details are not described herein.

Figure 10:
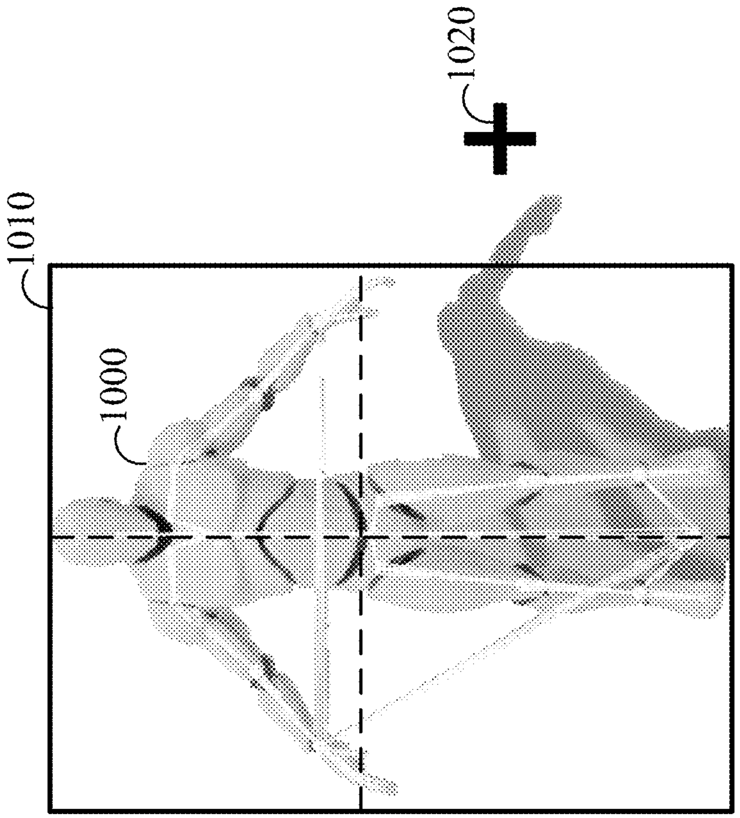
FIG. 10 is a principle diagram of an invalid condition of an active adsorption mode according to an embodiment of this application.

FIG. 10 is a principle diagram of an invalid condition for an active adsorption mode according to an embodiment of this application. As shown in FIG. 10, the active adsorption logic of the front sight is triggered when it is determined that the aiming target is correlated with the adsorption detection range 1010 of the first virtual object 1000 based on the method in the foregoing step 303. Afterwards, the displacement velocity at each frame is adjusted using the adsorption correction factor calculated in real time, and then the active adsorption logic continuously takes effect. If it is detected that the front sight 1020 moves from the inside of the adsorption detection range 1010 to the outside of the adsorption detection range 1010 at a certain frame, the duration for which the front sight 1020 is located outside the adsorption detection range 1010 is timed until the duration for which the front sight 1020 is located outside the adsorption detection range 1010 exceeds the first duration, and then the active adsorption logic is invalid, which means that the adsorption correction factor is no longer calculated in real time, and the operation of adjusting the displacement velocity at each frame using the adsorption correction factor is stopped. Notably, after the active adsorption logic fails, if the triggering condition (i.e., effective condition) for the active adsorption logic is re-determined, the active adsorption logic is enabled again.

Interface performance of the active adsorption mode is described below in combination with a game interface of a possible FPS game. The active adsorption mode provided in this embodiment of this application can not only improve the user's operation accuracy of aiming at the aiming target on the mobile terminal using a virtual prop can be improved, but also achieve auxiliary aiming according to the movement trend of the front sight actively operated by the user. Accelerating or decelerating the moving adsorption of the front sight can help the user quickly aim at the aiming target on the mobile terminal using the front sight, and make the adsorption performance of auxiliary aiming more natural, and can be applied to different kinds of adsorption performances required by many different types of virtual props.

Figure 11:
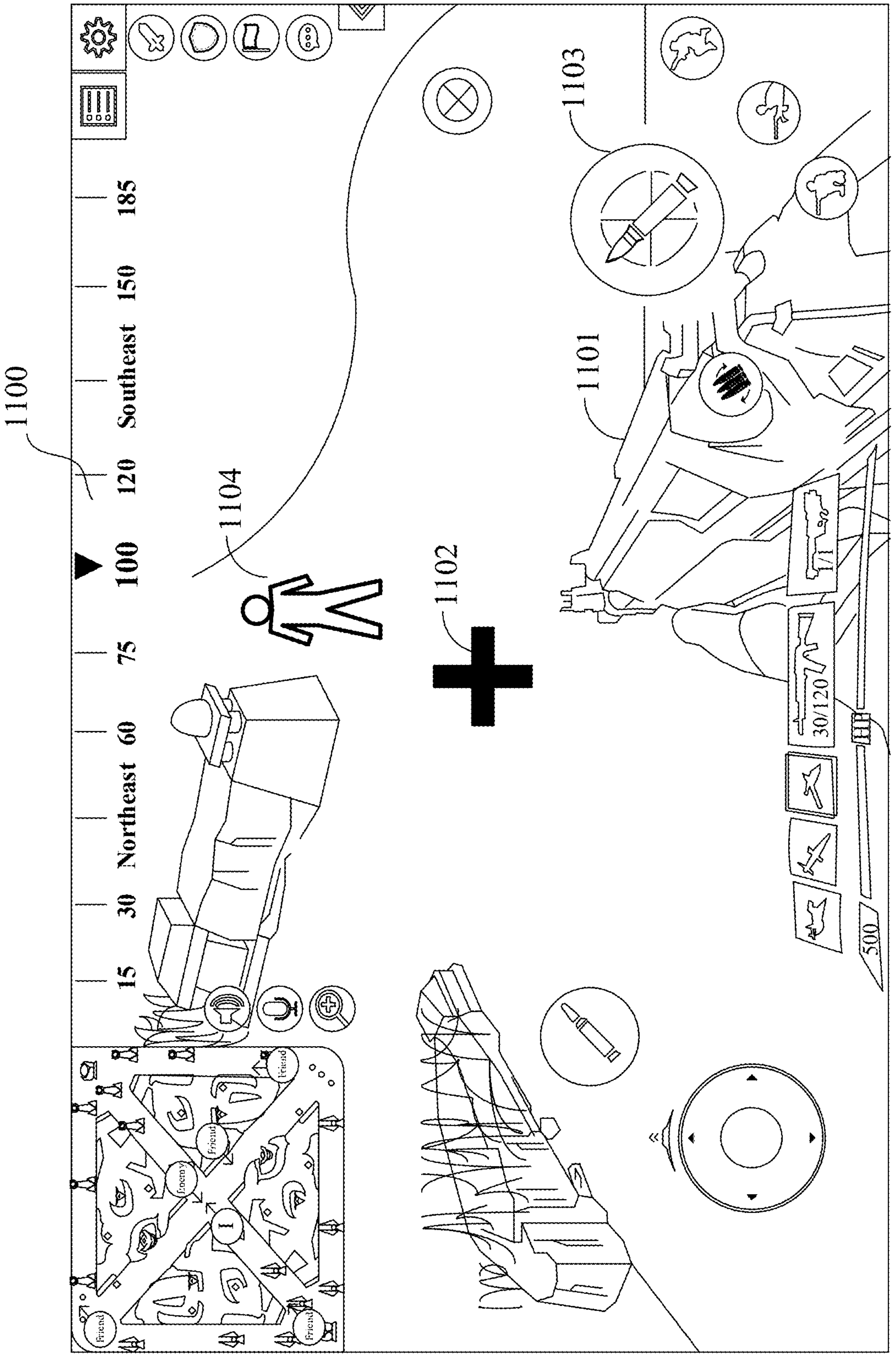
FIG. 11 is a schematic diagram of an interface of an aiming picture according to an embodiment of this application.

FIG. 11 is a schematic diagram of an interface of an aiming picture according to an embodiment of this application. As shown in FIG. 11, the aiming picture 1100 is displayed in the terminal screen, and a virtual prop 1101 and a front sight 1102 are displayed in the aiming picture 1100, where the virtual prop 1101 is a virtual prop currently used by the master virtual object, and the front sight 1102 is fixed to the center point of the aiming picture 1100. Schematically, an ejection control 1103 is also displayed in the aiming picture 1100. The ejection control 1103 is commonly known as a firing button, and the user can perform a triggering operation on the ejection control 1103 to trigger the master virtual object to control the virtual prop 1101 to eject the corresponding projectile, so that the projectile can fly to the landing point indicated by the front sight 1102. It can be seen that the first virtual object 1104 is also displayed in the aiming picture 1100. In the process of actively aiming at the first virtual object 1104, the user needs to control the front sight 1102 to be pulled toward the first virtual object 1104. The terminal determines the displacement direction of the front sight 1102 at each frame. When there is an intersection between the extension line in the displacement direction and the adsorption detection range of the first virtual object 1104, the active adsorption logic of the front sight 1102 is triggered. At this time, affected by an adsorption force pointing to the first virtual object 1104, the front sight 1102 acquires an adsorption correction factor pointing to the first virtual object 1104 on the basis of the original displacement velocity.

Figure 12:
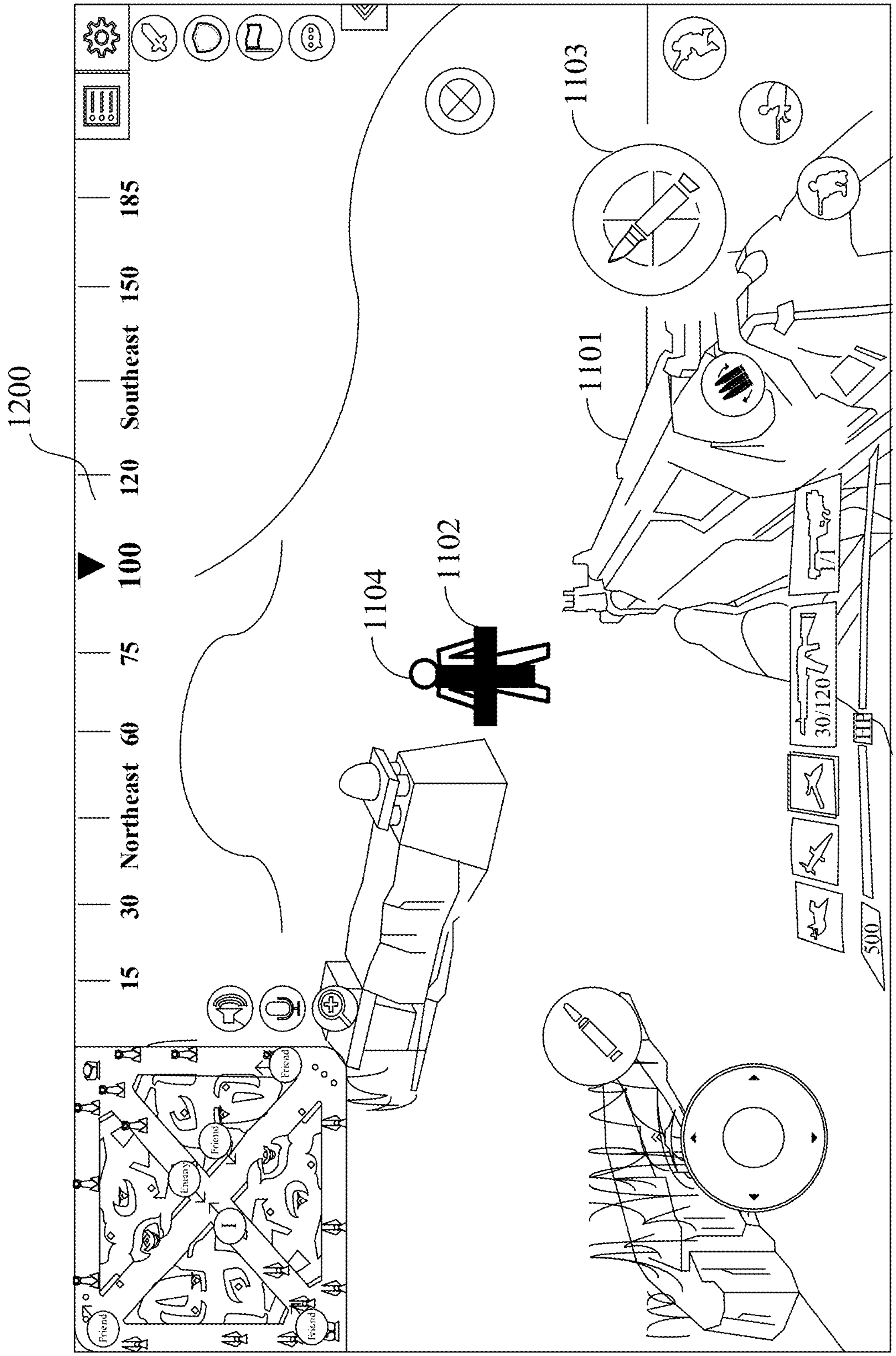
FIG. 12 is a schematic diagram of an interface of an aiming picture according to an embodiment of this application.

FIG. 12 is a schematic diagram of an interface of an aiming picture according to an embodiment of this application. Referring to FIG. 12, an aiming picture 1200 is displayed in the terminal screen, on the basis of the content shown in FIG. 11, and the triggering of the active adsorption logic of the front sight 1102, the displacement velocity of the front sight 1102 is affected by the adsorption correction factor. For example, the adsorption correction factor is the first correction factor which provides acceleration to the displacement velocity, so that the front sight 1102 moves faster to the adsorbed target, i.e., the first virtual object 1104, until the front sight 1102 is moved onto the first virtual object 1104. It can be seen from FIG. 12 that the front sight 1102 already coincides with the first virtual object 1104, at this time, the user can press the ejection control 1103 to launch fire against the virtual prop, play firing animation, and control the projectile corresponding to the virtual prop to fly to the first virtual object 1104 indicated by the front sight 1102, and when the projectile hits the first virtual object 1104, a corresponding action can be produced, e.g., the virtual hit point of the first virtual object 1104 is deducted.

The active adsorption mode introduced in this embodiment of this application is suitable for both shooting with opened telescope and shooting without opened telescope, and is applicable to both the aiming picture in the first-person perspective and the aiming picture in the third-person perspective. The adsorption acceleration intensity and the adsorption acceleration type of different virtual props can be pre-configured or customized on the server side to adapt to the aiming habits of different users. It has good universality and is easy to popularize and apply in different scenarios.

Further, adsorption of the front sight is achieved on the basis of the aiming operation (i.e., the operation of adjusting the front sight) initially performed by the user, if the user manually makes the front sight aim at the first virtual object, directional acceleration is provided for the displacement velocity in the original displacement direction, which is consistent with the trend of the aiming operation initially performed by the user, instead of making the front sight instantly aim at the first virtual object, thereby bringing a natural, smooth and unobtrusive adsorption effect of the front sight. Meanwhile, the active adsorption mode is triggered in the process of adjusting the front sight by the user, and the triggering mode is also smooth and unobtrusive, which brings an aiming result better fitting the aiming result achieved by user's manual operation. Moreover, when the user manually separates the front sight from the first virtual object, the displacement direction of the front sight is not changed, only directional deceleration is provided to the original displacement velocity, that is, the drag of the front sight slows down, without causing the situation that the front sight cannot be dragged away and is adsorbed onto the first virtual object, that is, the adsorption performance would not be independent of the player's subjective aiming intention.

An embodiment of this application may be formed by using any combination of all the foregoing technical solutions, and details are not described herein.

According to the method provided in this embodiment of this application, on the basis of the aiming operation originally performed by the user, if it is determined that the aiming target is correlated with the adsorption detection range of the first virtual object, it indicates that the user has the intention to aim the first virtual object. At this time, by applying an adsorption correction factor to the original displacement velocity and adjusting the displacement velocity by the adsorption correction factor, the adjusted target adsorption velocity better suits the user's aiming intention, so that the front sight can focus on the aiming target more accurately, and the efficiency of human-machine interaction is greatly improved.

In the above embodiment, the trigger conditions of the active adsorption mode and the way to modify the displacement velocity according to the adsorption correction factor are described in detail. This embodiment of this application also relates to an adsorption logic (called passive adsorption logic) which is not based on the aiming operation enabled actively by the user, that is, when the front sight is located within the adsorption detection range of the second virtual object, the passive adsorption logic of the front sight is triggered. In other words, the active adsorption logic depends on the aiming operation performed by the user, and is not enabled when the user does not perform the aiming operation, while the passive adsorption logic does not depend on the aiming operation performed by the user, and when the user does not perform the aiming operation, the passive adsorption logic of the front sight can be triggered as long as the front sight is located within the adsorption detection range of the second virtual object.

In some embodiments, when the front sight is located within the adsorption detection range of the second virtual object, the terminal controls the front sight to automatically move to the second virtual object, where the second virtual object is a virtual object capable of being adsorbed in the virtual scenario, and the second virtual object may be a first virtual object in the above embodiment. The terminal can detect whether the front sight is within the adsorption detection range for every frame in the game to determine whether the front sight is within the adsorption detection range of any second virtual object, thus deciding whether to trigger the passive adsorption logic. When the adsorption detection range is a three-dimensional spatial range, the above detection process refers to the process of detecting whether the projection point of the front sight inversely projected to the virtual scenario is within the three-dimensional spatial range; and when the adsorption detection range is a two-dimensional planar region, the above detection process refers to the process of detecting whether the front sight is located in the two-dimensional planar region corresponding to the second virtual object in the aiming picture. The way to detect whether the front sight is located within the adsorption detection range is not specifically limited in this embodiment of this application.

In some embodiments, the process of controlling the front sight to move to the second virtual object refers to the process of controlling the front sight to be adsorbed onto the second virtual object at a preset adsorption velocity, where the preset adsorption velocity is an adsorption velocity pre-configured by a person skilled in the art under the passive adsorption logic. Under the passive adsorption logic, the method of obtaining the adsorption point corresponding to the front sight is similar to step 304 above, which is not described in detail herein. After the adsorption point is obtained, the direction from the front sight to the adsorption point is regarded as a displacement direction of the front sight under the passive adsorption logic, and the adsorption velocity of the front sight is regarded as a preset adsorption velocity under the passive adsorption logic, and thus the front sight is controlled to automatically move to the adsorption point corresponding to the second virtual object at the preset adsorption velocity in the displacement direction.

Figure 13:
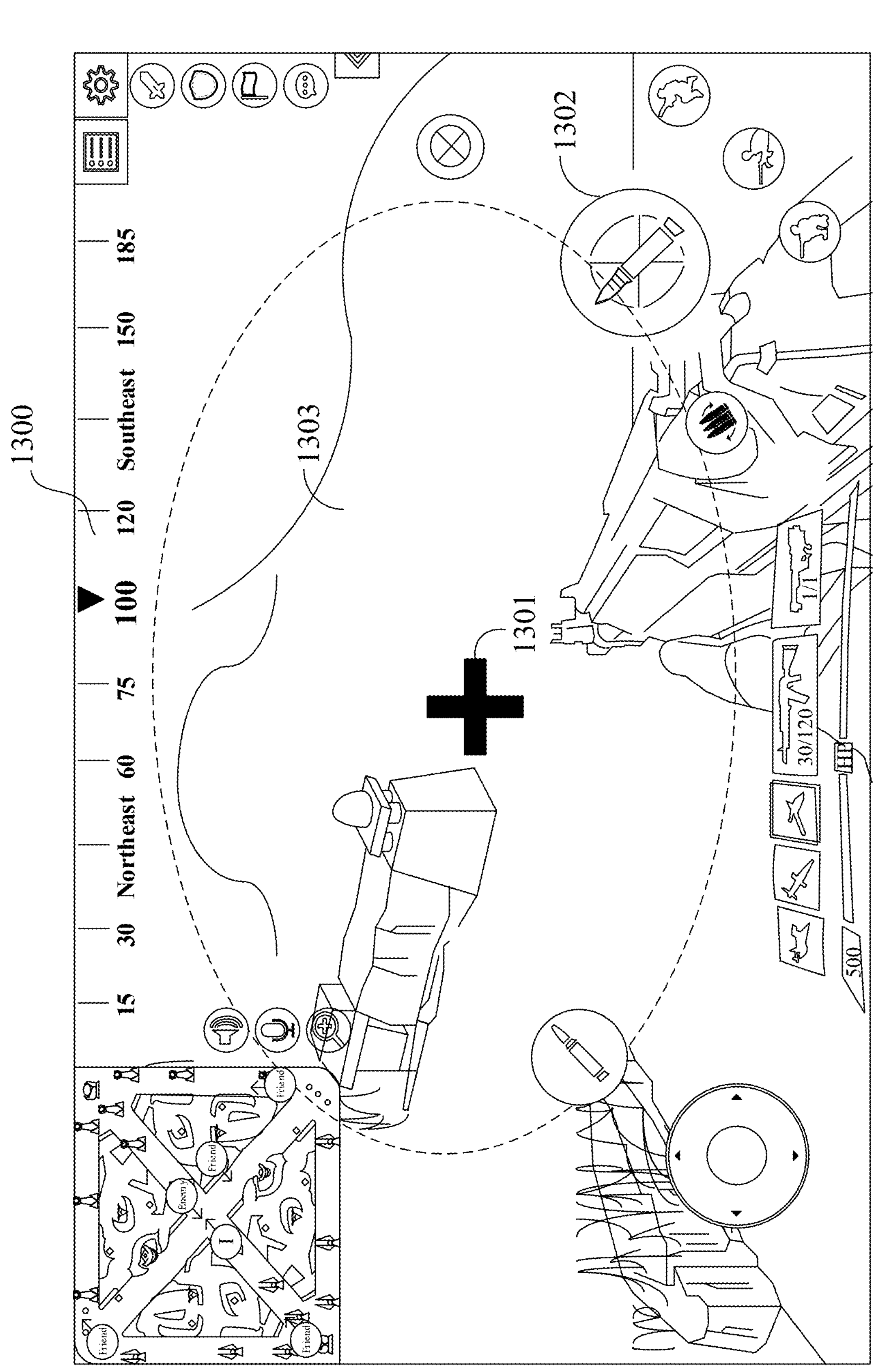
FIG. 13 is a schematic diagram of an interface of an aiming picture according to an embodiment of this application.

FIG. 13 is a schematic diagram of an interface of an aiming picture according to an embodiment of this application. As shown in FIG. 13, an aiming picture 1300 is displayed in a terminal screen, and a front sight 1301 of a virtual prop is displayed on a center point of the aiming picture 1300. In some embodiments, an ejection control 1302 is also displayed in the aiming picture 1300. The ejection control 1302 is commonly known as a firing button, and the user can perform a triggering operation on the ejection control 1302 to trigger the master virtual object to control the virtual prop to eject the corresponding projectile, so that the projectile can fly to the landing point indicated by the front sight 1301. Schematically, a second virtual object

1303 is also displayed in the aiming picture 1300. When the user does not manually adjust the front sight 1301, that is, the aiming operation is not performed, assuming the terminal detects that the front sight 1301 is located within the adsorption detection range of the second virtual object 1303 at the current frame, then the passive adsorption logic of the front sight 1301 is triggered, that is, the front sight 1301 is controlled to be automatically adsorbed onto the second virtual object 1303.

Figure 14:
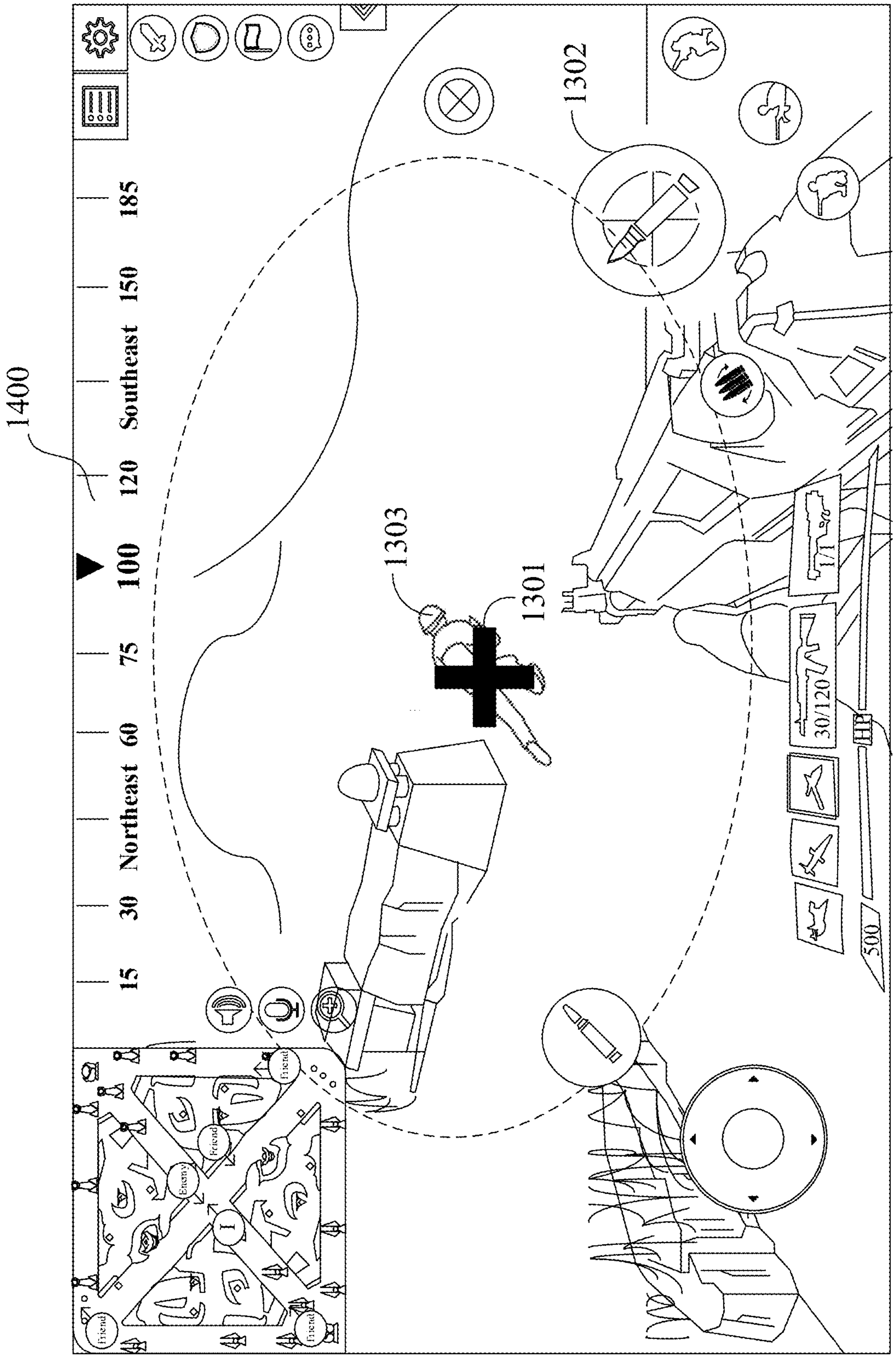
FIG. 14 is a schematic diagram of an interface of an aiming picture according to an embodiment of this application.

FIG. 14 is a schematic diagram of an interface of an aiming picture according to an embodiment of this application. Referring to FIG. 14, an aiming picture 1400 is displayed in the terminal screen, on the basis of the content shown in FIG. 13, and the triggering of the passive adsorption logic of the front sight 1301, the terminal controls the front sight 1301 to automatically move to the second virtual object 1303 until the front sight 1301 moves to the corresponding adsorption point on the second virtual object 1303. It can be seen from FIG. 14 that the front sight 1301 already coincides with the second virtual object 1303, at this time, the user can press the ejection control 1302 to launch fire against the virtual prop, play firing animation, and control the projectile corresponding to the virtual prop to fly to the second virtual object 1303 indicated by the front sight 1301, and when the projectile hits the second virtual object 1303, a corresponding action can be produced, e.g., the virtual hit point of the second virtual object 1303 is deducted.

In some embodiments, when the passive adsorption logic is enabled, it is very likely that the second virtual object is displaced in the virtual scenario affected by the operation of other users in the current game. Therefore, when the second virtual object is displaced, the terminal can automatically control the front sight to follow the second virtual object to move at a target velocity. The target velocity is the following velocity of the front sight. In some embodiments, the target velocity is also a velocity pre-configured by a person skilled in the art, showing the effect that the front sight asynchronously follows the second virtual object for displacement, which is more in line with the visual effect in a real scenario that the user continuously tracks the enemy when finding the enemy escapes; or the target velocity is always consistent with the displacement velocity of the second virtual object, showing the effect that the front sight follows the second virtual object for synchronous displacement, which can improve the aiming accuracy of the front sight, and makes it convenient for the user to open fire at any time.

Figure 15:
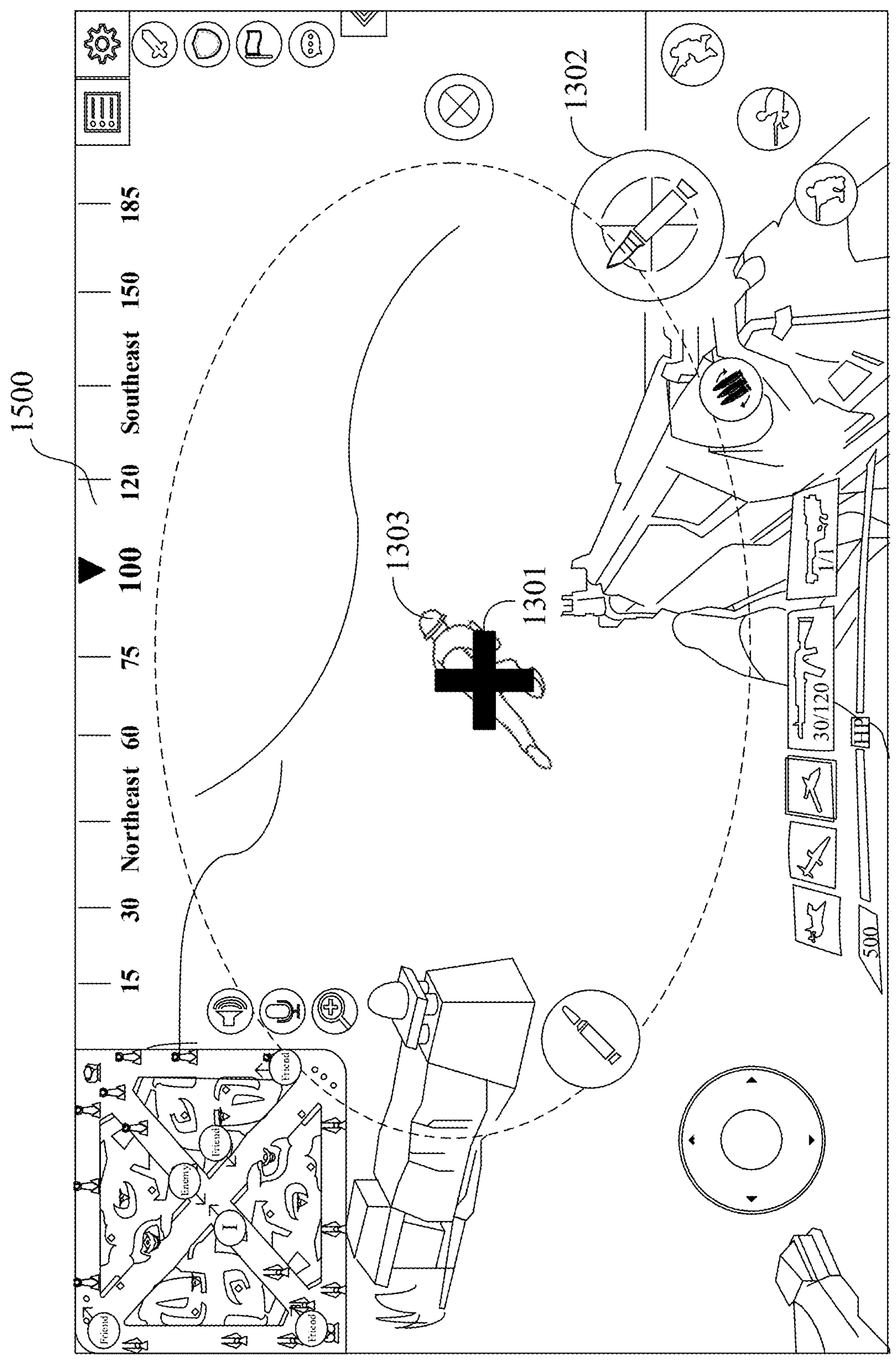
FIG. 15 is a schematic diagram of an interface of an aiming picture according to an embodiment of this application.

FIG. 15 is a schematic diagram of an interface of an aiming picture according to an embodiment of this application. As shown in FIG. 15, the aiming picture 1500 is displayed in the terminal screen, and on the basis of the content shown in FIG. 14, the front sight 1301 is automatically adsorbed onto the corresponding adsorption point on the second virtual object 1303 under the influence of the passive adsorption logic on the condition that the user does not perform an aiming operation. It can be seen that the second virtual object 1303 is displaced (translated rightwards by a distance) in the virtual scenario compared to the position in FIG. 14, and given that the front sight 1301 is still locked on the corresponding adsorption point of the second virtual object 1303 at this time, the front sight 1301 follows the second virtual object 1303 to move.

In some embodiments, when the passive adsorption logic is enabled, if the front sight continuously aims at the second virtual object but the user delays opening fire, it indicates that the second virtual object is probably not the aiming target for the user. Therefore, an invalid condition of passive adsorption logic is provided, that is, a threshold of the adsorption duration for which the front sight is adsorbed onto the second virtual object is set to be a second duration with a value greater than 0, such as 1 second, 1.5 seconds, etc., and the second duration is not specifically limited in this embodiment of this application.

In some embodiments, when the adsorption duration for which the front sight is adsorbed onto the second virtual object is less than a second duration, the terminal controls the front sight to follow the second virtual object to move in response to displacement of the second virtual object, and the passive adsorption logic continues to take effect at this time; and when the adsorption duration for which the front sight is adsorbed onto the second virtual object is greater than or equal to the second virtual object, the terminal no longer controls the movement of the front sight along with the second virtual object, that is, the adsorption of the front sight to the second virtual object is canceled, and at this time, the passive adsorption logic is disabled.

This embodiment of this application gives a description on the passive adsorption mode and how to automatically adsorb the front sight to the aiming target without the need for the user to perform the aiming operation. In some embodiments, when the front sight is located within the adsorption detection range of the second virtual object, if the horizontal height of the front sight is greater than or equal to the horizontal height of a target dividing line of the second virtual object, then a head skeleton point of the second virtual object is taken as an adsorption point; and if the horizontal height of the front sight is less than the horizontal height of the target dividing line of the second virtual object, the somatic skeleton point on a vertical central axis of the second virtual object which has the same horizontal height as the front sight is taken as the adsorption point. In addition, the above passive adsorption logic can essentially be regarded as the process of modifying the orientation of the camera mounted on the master virtual object. When the front sight is controlled to move to the adsorption point, the front sight can be gradually moved from the current position at the current frame to the adsorption point by interpolation operation. Notably, the passive adsorption mode is suitable for both shooting with opened telescope and shooting without opened telescope, and is applicable to both the aiming picture in the first-person perspective and the aiming picture in the third-person perspective, which is not limited in this embodiment of this application.

In the above two embodiments, the active adsorption mode and the passive adsorption mode are described in detail respectively. Both adsorption modes are suitable for both shooting with opened telescope and shooting without opened telescope, and are applicable to both the aiming picture in the first-person perspective and the aiming picture in the third-person perspective. Both the active adsorption mode and the passive adsorption mode have high universality and a wide range of application scenarios, and can not only meet strict requirements of confrontation shooting games for high real-time performance and accuracy, but also improve the aiming accuracy of virtual props, the fidelity of aiming process and the usability of the auxiliary aiming function.

In this embodiment of this application, when the front sight is within the adsorption detection range, a friction detection range can be configured within the adsorption detection range for each first virtual object according to the configuration at the server side by a person skilled in the art, where the friction detection range is configured to determine whether it is necessary to enable the correction logic based on friction force for the front sight. Notably, the correction logic based on friction force can take effect along with the active adsorption logic or passive adsorption logic of the above embodiment. That is, when the front sight is within the friction detection range, it represents the front sight is also within the adsorption detection range since the friction detection range is within the adsorption detection range. Whether to enable the active adsorption logic or passive adsorption logic can be determined according to the aiming operation performed by the user, so as to control the adsorption of the front sight onto the aiming target. At the same time, it is possible to directly act on the camera mounted on the master virtual object according to the correction logic based on friction force in this embodiment of this application, and a friction resistance is provided for the steering operation of the front sight driven by the steering of the camera, which is described in detail below.

In some embodiments, when the front sight is within the adsorption detection range of the first virtual object (or the second virtual object), the terminal detects whether the front sight is within the friction detection range of the adsorption detection range at each frame. When the front sight is within the friction detection range of the adsorption detection range, the friction correction factor corresponding to the front sight is determined, where the friction correction factor is a value greater than or equal to 0 and less than or equal to 1. Then, the terminal corrects the steering angle corresponding to the steering operation in response to the steering operation on the front sight, and based on the friction correction factor to acquire target steering angle, thereby controlling the orientation of the front sight in the virtual scenario to rotate by the target steering angle. In other words, the friction correction factor directly acts on the steering angle of the steering operation on the front sight, which is a kind of correction logic for the steering angle.

In the above process, the steering angle of the steering operation is modified by the friction correction factor, so that when the front sight is within the friction detection range, if the user tries to control the front sight to be away from the aiming target, the modified target steering angle is smaller than the original real steering angle, given that the target steering angle is affected by the friction correction factor (with a value range of [0, 1]). As a result, the rotation velocity of the front sight is reduced in terms of user perception, so that the front sight stays more time within the adsorption detection range of the aiming target, making the user feel difficult to operate the front sight to steer when controlling the front sight to enter the friction detection range.

The way to acquire the friction correction factor is described in detail below.

In some embodiments, the friction detection range includes a first target point (horzontalMin, verticalMin) and a second target point (horzontalMax, verticalMax), where the friction correction factor at the first target point is a minimum value TurnInputScaleFact.x, and the minimum value TurnInputScaleFact.x can be set to 0, 0.1, 0.2 or other value; and the friction correction factor at the second target point is a maximum value TurnInputScaleFact.y, and the maximum value TurnInputScaleFact.y can be set to 1, 0.9, 0.8 or other value. The minimum value TurnInputScaleFact.x and the maximum value TurnInputScaleFact.y need to meet the following condition: both the minimum value TurnInputScaleFact.x and the maximum value TurnInputScaleFact.y are within the value range [0, 1] of the friction correction factor, and the minimum value TurnInputScaleFact.x is less than the maximum value TurnInputScaleFact.y, which is not specifically limited in this embodiment of this application.

Figure 16:
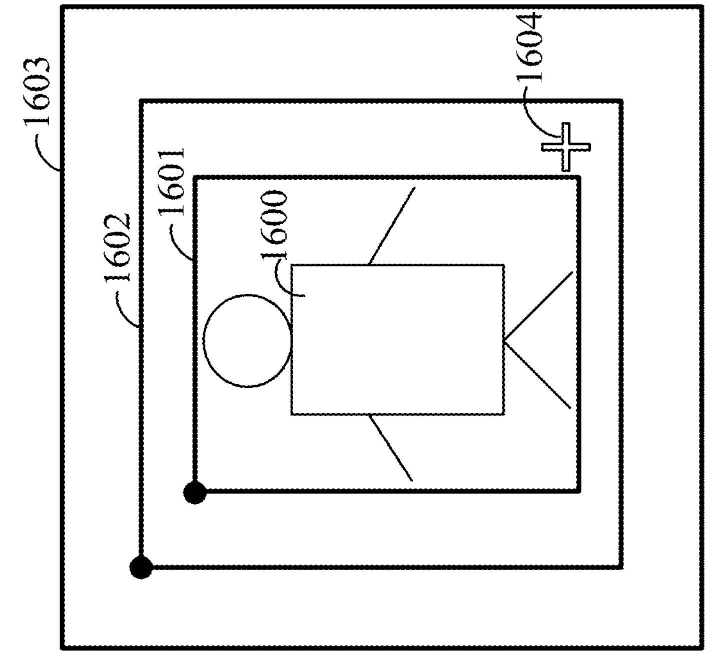
FIG. 16 is a principle diagram of a friction detection range according to an embodiment of this application.

FIG. 16 is a principle diagram of a friction detection range according to an embodiment of this application. As shown in FIG. 16, a first virtual object 1600 is provided, a frictional inner frame 1601 is configured outside the first virtual object 1600, a vertex at the upper left of the frictional inner frame 1601 is the first target point (horzontalMin, verticalMin), and when the front sight is located at the first target point, the friction correction factor of the front sight is set to the minimum value TurnInputScaleFact.x. A frictional outer frame 1602 is configured outside the frictional inner frame 1601, a vertex at the upper left of the frictional outer frame 1602 is the second target point (horzontalMax, verticalMax), and when the front sight is located at the second target point, the friction correction factor of the front sight is set to the maximum value TurnInputScaleFact.y. The frictional outer frame 1602 is the boundary of the friction detection range in this embodiment of this application. In addition, an adsorption detection frame 1603 is also arranged outside the frictional outer frame 1602, where the adsorption detection frame 1603 is the boundary of the adsorption detection range in this embodiment of this application. The current position of the front sight 1604 is expressed as (aim2D.x, aim2D.y). Since the front sight 1604 is currently located inside the frictional outer frame 1602, it will be affected by both the adsorption force exerted on its displacement velocity and friction force exerted on its rotation angle.

Based on the given minimum value TurnInputScaleFact.x and the maximum value TurnInputScaleFact.y, the terminal can perform interpolation operation between the minimum value TurnInputScaleFact.x and the maximum value TurnInputScaleFact.y according to a position coordinate (aim2D.x, aim2D.y) of the front sight to obtain a friction correction factor, where the friction correction factor is positively correlated with a fourth distance, which is the distance from the front sight to the first target point. That is, the closer the distance between the front sight and the first target point, the less the friction correction factor, and the greater the friction force exerted. On the contrary, the farther the distance between the front sight and the first target point, the greater the friction correction factor, and the less the friction force. When the front sight is out of the friction detection range (that is, the front sight is located outside the frictional outer frame 1602), it is no longer affected by friction force.

In some embodiments, a terminal acquires a horizontal distance from the first target point (horzontalMin, verticalMin) and the second target point (horzontalMax, verticalMax), where the horizontal distance is determined as a horizontal threshold, which can be expressed as: horizontalMax−horizontalMin; Next, the terminal acquires a vertical distance between the first target point (horzontalMin, verticalMin) and the second target point (horzontalMax, verticalMax), where the vertical distance is determined as a vertical threshold, which can be expressed as: verticalMax−verticalMin.

In some embodiments, prior to conducting interpolation operation between the minimum value and the maximum value, first acquire a horizontal distance (aim2D.x−horizontalMin) between the front sight (aim2D.x, aim2D.y) and the first target point (horizontalMin, verticalMin) and a vertical distance (aim2D.y−verticalMin) between the front sight and the first target point. Then acquire a first ratio hRatio and a second ratio vRatio, where the first ratio hRatio is a ratio of the horizontal distance to the horizontal threshold, and the second ratio vRatio is a ratio of the vertical distance to the vertical threshold. hRatio and vRatio can be represented by the following formulas, respectively:

$$hRatio=(aim2D.x-horizontalMin)/(horizontalMax-horizontalMin);$$

$$vRatio=(aim2D.y-verticalMin)/(verticalMax-verticalMin).$$

Further, when the first ratio is greater than or equal to the second ratio (i.e., hRatio≥vRatio), conduct, based on the first ratio, interpolation operation between the minimum value and the maximum value; and when the first ratio is less than the second ratio (i.e., hRatio<vRatio), conduct, based on the second ratio, interpolation operation between the minimum value and the maximum value.

Schematically, interpolation operation is achieved through an interpolation function FMath::Lerp(F1, F2, F3), where it is required to input three parameters F1, F2 and F3 to the interpolation function, with F1 representing the minimum value (i.e., starting point) in interpolation operation, F2 representing the maximum value (i.e., ending point) in interpolation operation, and F3 representing a variable proportion.

Schematically, when hRatio≥vRatio, set the parameters in the interpolation operation as follows: F1=TurnInput- ScaleFact.x, F2=TurnInputScaleFact.y and F3=hRatio, where the friction correction factor is expressed by the following formula:

$$fact=FMath::Lerp(TurnInputScaleFact.x, TurnInputScaleFact.y, hRatio).$$

Schematically, when hRatio<vRatio, set the parameters in the interpolation operation as follows: F1=TurnInput- ScaleFact.x, F2=TurnInputScaleFact.y, F3=vRatio, where the friction correction factor is expressed by the following formula:

$$fact=FMath::Lerp(TurnInputScaleFact.x, TurnInputScaleFact.y, vRatio).$$

In this case, assuming that the steering angle (i.e., the steering angle of the camera) of the steering operation performed by the user on the front sight at the current frame is expressed as deltaRotator, then the target steering angle (deltaRotator=deltaRotator*fact) is acquired after correction by the friction correction factor fact, that is, the product deltaRotator*fact of the friction correction factor and the original steering angle is assigned to deltaRotator.

To put it another way, assuming that the difference between the edge length of the frictional outer frame and the edge length of the frictional inner frame is called the width of frictional frame, since the first target point is located at the upper left vertex of the frictional inner frame, and the second target point is located at the upper left vertex of the frictional outer frame, the horizontal threshold accounts for ½ of the width of the frictional frame on the horizontal axis, and the vertical threshold accounts for ½ of the width of the frictional frame on the vertical axis. Therefore, the overall formula of the above friction correction factor can be expressed as follows: friction factor=lerp (Min friction force, Max friction force, distance between the front sight and the adsorption point/(0.5×the width of adsorption frame)).

Lerp still refers to an interpolation function, Min friction force refers to a minimum value TurnInputScaleFact.x of a friction correction factor, Max friction force refers to a maximum value TurnInputScaleFact.y of the friction correction factor, and a maximum value in hRatio and vRatio is taken as the value of distance between the front sight and the adsorption point/(0.5×width of adsorption frame).

In this embodiment of this application, by introducing the process of correcting the steering angle of the steering operation performed by the user on the front sight based on the friction correction factor when the front sight is within the friction detection range of the adsorption detection range, when the front sight is within the friction detection range, the corrected target steering angle would be smaller than the original real steering angle if the user tries to manipulate the front sight to be away from the aiming target. Thus, the rotation velocity of the front sight is reduced in terms of user perception, so that the front sight stays more time within the adsorption detection range of the aiming target, making the user feel difficult to operate the front sight to steer. In this way, the aiming accuracy of the virtual prop is improved, and the efficiency of human-machine interaction is improved. Further, since interpolation operation is conducted using the maximum value in hRatio and vRatio, the two proportions hRatio and vRatio can be calculated after the first target point and the second target point are specified regardless of the shape of the friction detection range (e.g., square, rectangle, circle or various irregular shapes), and the friction correction factor is calculated on this basis, which improves the calculation accuracy of the friction correction factor.

Figure 17:
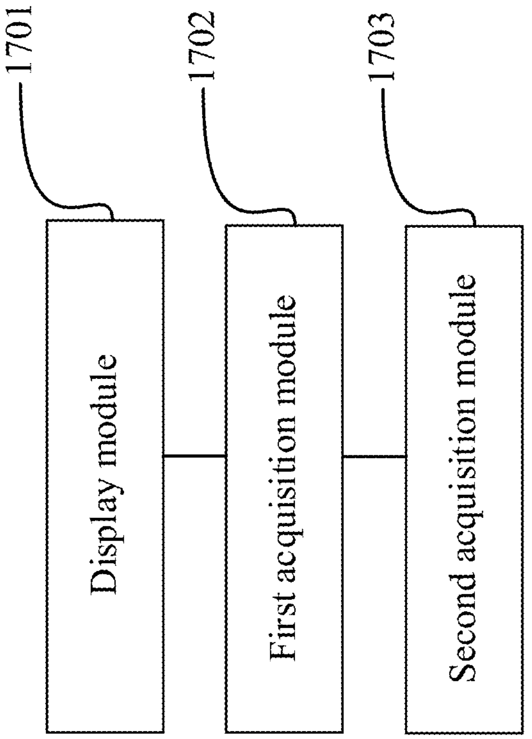
FIG. 17 is a schematic structural diagram of an apparatus for controlling a front sight in a virtual scenario according to an embodiment of this application.

FIG. 17 is a schematic structural diagram of an apparatus for controlling a front sight in a virtual scenario according to an embodiment of this application. Referring to FIG. 17, the apparatus includes: a display module 1701 configured to display a first virtual object in a virtual scenario; a first acquisition module 1702 configured to acquire a displacement direction and a displacement velocity of the front sight performing an aiming operation in response to the aiming operation on a virtual prop; and a second acquisition module 1703 configured to acquire an adsorption correction factor associated with the displacement direction in response to the process that it is determined that an aiming target corresponding to the aiming operation is correlated with an adsorption detection range corresponding to the first virtual object based on the displacement direction; where the display module 1701 is further configured to display the movement of the front sight at a target adsorption velocity, where the target adsorption velocity is acquired after adjusting the displacement velocity by the adsorption correction factor.

According to the apparatus provided in this embodiment of this application, on the basis of the aiming operation originally performed by the user, if it is determined that the aiming target is correlated with the adsorption detection range of the first virtual object, it indicates that the user has the intention to aim the first virtual object. At this time, by applying an adsorption correction factor to the original displacement velocity and adjusting the displacement velocity by the adsorption correction factor, the adjusted target adsorption velocity better suits the user's aiming intention, so that the front sight can focus on the aiming target more accurately, and the efficiency of human-machine interaction is greatly improved.

In a possible implementation, the second acquisition module 1703 is configured to: when there is an intersection between an extension line in the displacement direction and the adsorption detection range, determine that the aiming target is correlated with the adsorption detection range to perform the operation of acquiring the adsorption correction factor.

In a possible implementation, based on the apparatus composition shown in FIG. 17, the second acquisition module 1703 includes: an acquisition unit configured to acquire an adsorption point corresponding to the front sight in the first virtual object; a first determining unit configured to determine, when a first distance is less than a second distance, a first correction factor as the adsorption correction factor, where the first distance is a distance between the front sight at a current frame and the adsorption point, and the second distance is a distance between the front sight at a last frame and the adsorption point; and a second determining unit configured to determine, when the first distance is greater than or equal to the second distance, a second correction factor as the adsorption correction factor.

In a possible implementation, based on the apparatus composition shown in FIG. 17, the first determining unit includes: a first determining subunit configured to determine an adsorption acceleration intensity based on the displacement direction, where the adsorption acceleration intensity characterizes the degree to which the displacement velocity is increased; an acquisition subunit configured to acquire an adsorption acceleration type corresponding to the virtual prop, where the adsorption acceleration type characterizes a manner in which the displacement velocity is increased; and a second determining subunit configured to determine the first correction factor based on the adsorption acceleration intensity and the adsorption acceleration type.

In a possible implementation, the first determining subunit is configured to: determine a first acceleration intensity as the adsorption acceleration intensity when the extension line intersects with a central axis of the first virtual object; and determine a second acceleration intensity as the adsorption acceleration intensity when the extension line does not intersect with a central axis of the first virtual object, where the second acceleration intensity is less than the first acceleration intensity.

In a possible implementation, the adsorption acceleration type includes at least one of the following: a uniform velocity correction type configured to increase the displacement velocity; an accelerated velocity correction type configured to preset an accelerated velocity for the displacement velocity; and a distance correction type configured to set a variable accelerated velocity for the displacement velocity, where the variable accelerated velocity is negatively correlated with a third distance, and the third distance is a distance between the front sight and the adsorption point.

In a possible implementation, the second determining unit is configured to: acquire the second correction factor by sampling from a correction factor curve based on a distance difference between the first distance and the second distance.

In a possible implementation, the acquisition unit is configured to: when a horizontal height of the front sight is greater than or equal to a horizontal height of a target dividing line of the first virtual object, determine a head skeleton point of the first virtual object as the adsorption point, where the target dividing line is configured to distinguish a head and a body of the first virtual object; and when a horizontal height of the front sight is less than a horizontal height of the target dividing line, determine a somatic skeleton point of the first virtual object as the adsorption point, where the somatic skeleton point is a skeleton point on a vertical central axis of the first virtual object which has the same horizontal height as the front sight.

In a possible implementation, the acquisition unit is further configured to: when the adsorption point is the somatic skeleton point, acquire a lateral offset and a longitudinal offset from the front sight to the first virtual object, where the lateral offset represents a distance between the front sight and the vertical central axis of the first virtual object, and the longitudinal offset represents a distance between the front sight and a horizontal central axis of the first virtual object; and determine a maximum value in the lateral offset and the longitudinal offset as a distance between the front sight and the adsorption point.

In a possible implementation, based on the apparatus composition shown in FIG. 17, the apparatus further includes: a determining module configured to determine a friction correction factor corresponding to the front sight when the front sight is within a friction detection range of the adsorption detection range; a correction module configured to, in response to a steering operation on the front sight, correct a steering angle corresponding to the steering operation based on the friction correction factor to acquire a target steering angle; and a first controlling module configured to control an orientation of the front sight in the virtual scenario to rotate by the target steering angle.

In a possible implementation, the friction detection range includes a first target point and a second target point, where the friction correction factor at the first target point is a minimum value, and the friction correction factor at the second target point is a maximum value. Based on the apparatus composition shown in FIG. 17, the determining module includes: interpolation operation unit configured to conduct, based on position coordinates of the front sight, interpolation operation between the minimum value and the maximum value to obtain the friction correction factor, where the friction correction factor is positively correlated with a fourth distance, and the fourth distance is a distance between the front sight and the first target point.

In a possible implementation, the interpolation operation unit is configured to: acquire a horizontal distance between the front sight and the first target point and a vertical distance between the front sight and the first target point; when a first ratio is greater than or equal to a second ratio, conduct interpolation operation between the minimum value and the maximum value based on the first ratio, where the first ratio is a ratio of the horizontal distance to a horizontal threshold, the second ratio is a ratio of the vertical distance to a vertical threshold, the horizontal threshold represents a horizontal distance between the first target point and the second target point, and the vertical threshold represents a vertical distance between the first target point and the second target point; and when the first ratio is less than the second ratio, conduct, based on the second ratio, interpolation operation between the minimum value and the maximum value.

In a possible implementation, based on the apparatus composition shown in FIG. 17, the apparatus further includes: a skipping module configured to, when the front sight moves from the inside of the adsorption detection range to the outside of the adsorption detection range, and a duration for which the front sight remains outside the adsorption detection range exceeds a first duration, skip adjusting the displacement velocity by the adsorption correction factor.

In a possible implementation, based on the apparatus composition shown in FIG. 17, the apparatus further includes: a second control module configured to control the front sight to move to the second virtual object when the front sight is located within the adsorption detection range of a second virtual object; where the second virtual object is a virtual object in the virtual scenario that is capable of being adsorbed.

In a possible implementation, the second control module is further configured to: when the second virtual object is displaced, control the front sight to follow the second virtual object to move at a target velocity.

In a possible implementation, the second control module is further configured to: when the adsorption duration for which the front sight is adsorbed to the second virtual object is less than a second duration, control the front sight to follow the second virtual object to move in response to displacement of the second virtual object.

In a possible implementation, the target adsorption velocity is a velocity vector, where the vector magnitude of the velocity vector is acquired by adjusting the displacement velocity based on the adsorption correction factor, and the vector direction of the velocity vector is acquired by adjusting the displacement direction based on the adsorption point of the front sight.

An embodiment of this application may be formed by using any combination of all the foregoing technical solutions, and details are not described herein.

Notably, when a front sight is controlled by using the apparatus for controlling a front sight in a virtual scenario provided in the foregoing embodiment, it is described only through an example of division of the functional modules. In an actual application, the foregoing functions may be assigned according to needs to be implemented by different functional modules, that is, the internal structure of an electronic device is divided into different functional modules, so as to implement all or a part of the functions described above. In addition, the apparatus for controlling a front sight in a virtual scenario and the method for controlling a front sight in a virtual scenario provided in the foregoing embodiments belong to one conception. For the specific implementation process, refer to the embodiments of the method for controlling a front sight in a virtual scenario, and details are not described herein. In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

Figure 18:
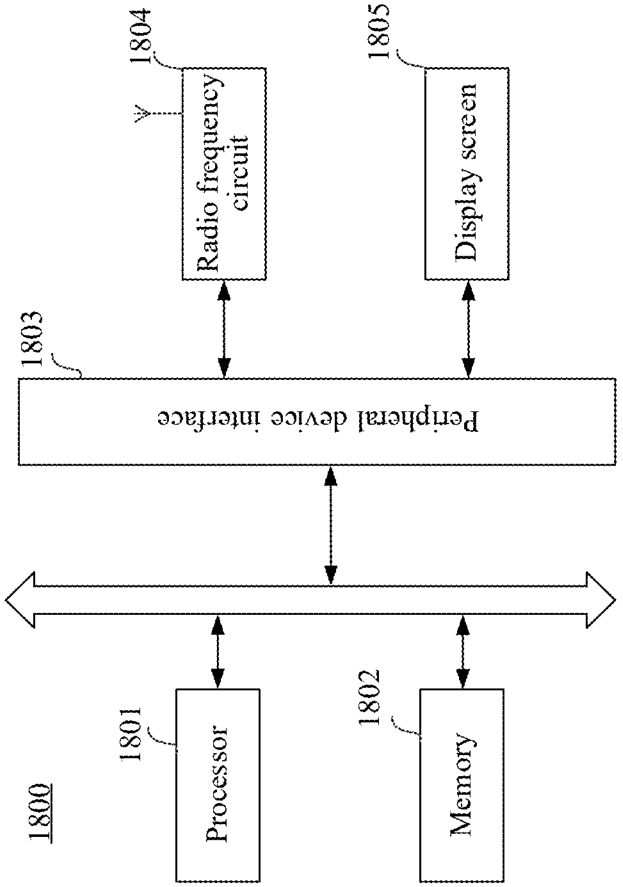
FIG. 18 is a schematic structural diagram of a terminal according to an embodiment of this application.

FIG. 18 is a schematic structural diagram of a terminal according to an embodiment of this application. As shown in FIG. 18, the terminal 1800 is an exemplary description of an electronic device. In some embodiments, the device type of the terminal 1800 includes: a smartphone, a tablet computer, a Moving Picture Experts Group Audio Layer III (MP3) player, a Moving Picture Experts Group Audio Layer IV (MP4) player, a notebook computer, or a desktop computer. The terminal 1800 may also be referred to as another name such as user equipment, a portable terminal, a laptop terminal, or a desktop terminal. Usually, the terminal 1800 includes: a processor 1801 and a memory 1802.

In some embodiments, the processor 1801 includes one or more processing cores, for example, a 4-core processor or an 8-core processor. In some embodiments, the processor 1801 is implemented in at least one hardware form of Digital Signal Processing (DSP), a field-programmable gate array (FPGA), and a programmable logic array (PLA). In some embodiments, the processor 1801 includes a main processor and a coprocessor. The main processor is a processor configured to process data in an awake state, and is also referred to as a central processing unit (CPU). The coprocessor is a low power consumption processor configured to process the data in a standby state.

In some embodiments, the memory 1802 includes one or more computer-readable storage media. In some embodiments, the computer-readable storage medium is non-transient. In some embodiments, the memory 1802 further includes a high-speed random access memory and a non-volatile memory such as one or more magnetic disk storage devices and a flash storage device. In some embodiments, the non-transitory computer-readable storage medium in the memory 1802 is configured to store at least one program code. The at least one program code is executed by the processor 1801 to implement the method for controlling a front sight in a virtual scenario provided in each embodiment of this application.

In some embodiments, the terminal 1800 further includes: a peripheral device interface 1803 and at least one peripheral device. The processor 1801, the memory 1802, and the peripheral device interface 1803 may be connected through a bus or a signal cable. Each peripheral device may be connected to the peripheral device interface 1803 through a bus, a signal cable, or a circuit board. Specifically, the peripheral device includes: at least one of a radio frequency (RF) circuit 1804 or a display screen 1805.

The peripheral device interface 1803 may be configured to connect the at least one peripheral device related to input/output (I/O) to the processor 1801 and the memory 1802. In some embodiments, the processor 1801, the memory 1802 and the peripheral device interface 1803 are integrated on the same chip or circuited board. In some other embodiments, any one or two of the processor 1801, the memory 1802, and the peripheral device interface 1803 may be implemented on a single chip or circuit board. This is not limited in this embodiment.

The RF circuit 1804 is configured to receive and transmit an RF signal, also referred to as an electromagnetic signal. The RF circuit 1804 communicates with a communication network and other communication devices through the electromagnetic signal. The RF circuit 1804 converts an electric signal into an electromagnetic signal for transmission, or converts a received electromagnetic signal into an electric signal. In some embodiments, the RF circuit 1804 includes: an antenna system, an RF transceiver, one or more amplifiers, a tuner, an oscillator, a digital signal processor, a codec chip set, a subscriber identity module card, and the like.

The display screen 1805 is configured to display a user interface (UI). In some embodiments, the UI includes a graph, a text, an icon, a video, and any combination thereof. When the display screen 1805 is a touch display screen, the display screen 1805 further has a capability of acquiring a touch signal on or above a surface of the display screen 1805. The touch signal may be inputted to the processor 1801 as a control signal for processing. In some embodiments, the display screen 1805 may be further configured to provide a virtual button and/or a virtual keyboard that are/is also referred to as a soft button and/or a soft keyboard.

A person skilled in the art may understand that the structure shown in FIG. 18 constitutes no limitation on the terminal 1800, and the terminal may include more or fewer components than those shown in the figure, or some components may be combined, or a different component deployment may be used.

Figure 19:
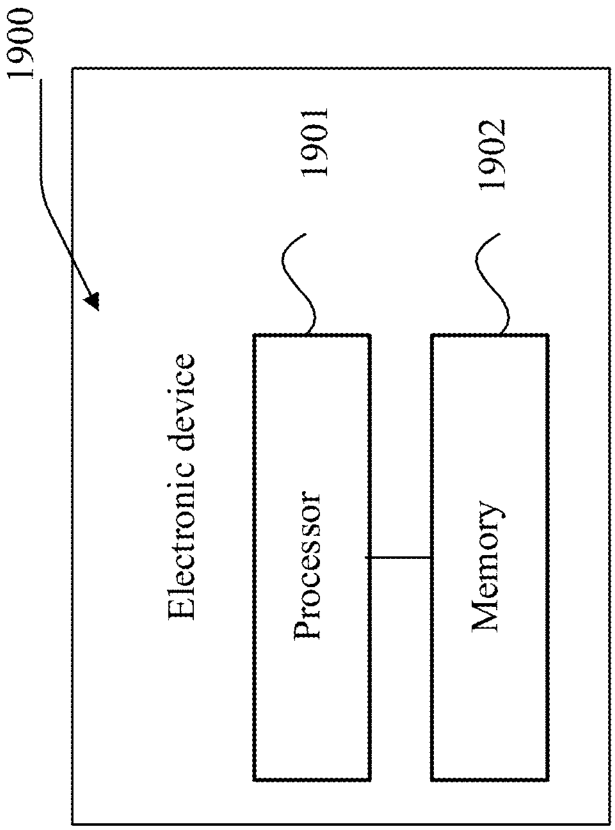
FIG. 19 is a schematic structural diagram of an electronic device according to an embodiment of this application.

FIG. 19 is a schematic structural diagram of an electronic device according to an embodiment of this application. The electronic device 1900 may vary largely due to difference in configurations or performance, and the electronic device 1900 includes one or more central processing units (CPUs) 1901 and one or more memories 1902, the one or more memories 1902 storing at least one computer program, the at least one computer program being loaded and executed by the one or more CPUs 1901 to implement the method for controlling a front sight in a virtual scenario provided in the foregoing embodiments. In some embodiments, the electronic device 1900 further includes components such as a wired or wireless network interface, a keyboard, and an input/output (I/O) interface, to facilitate input and output. The electronic device 1900 further includes other components configured to implement a function of a device. Details are not further described herein.

In an exemplary embodiment, a computer-readable storage medium, such as a memory including at least one computer program, is further provided, and the at least one computer program may be executed by a processor in a terminal to implement the method for controlling a front sight in a virtual scenario in the foregoing embodiments. For example, the computer-readable storage medium includes a read-only memory (ROM), a random access memory (RAM), a compact disc read-only memory (CD-ROM), a magnetic tape, a floppy disk, an optical data storage device, and the like.

In an exemplary embodiment, a computer program product is further provided, the computer program product including at least one computer program, the at least one computer program being loaded and executed by a processor to implement the method for controlling a front sight in a virtual scenario described in the above embodiment.

A person of ordinary skill in the art may understand that all or some of the steps of the foregoing embodiments may be implemented by hardware or a program instructing relevant hardware. The program is stored in a computer readable storage medium. In some embodiments, the storage medium mentioned above is a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A method for controlling a front sight of a virtual prop in a virtual scenario performed by an electronic device, the method comprising:

displaying a first virtual object in the virtual scenario, the first virtual object having an adsorption detection range;

in response to an aiming operation on the virtual prop, acquiring a displacement direction and a displacement velocity of the front sight associated with the aiming operation;

acquiring an adsorption correction factor associated with the displacement direction when it is determined that an aiming target of the aiming operation is correlated with the adsorption detection range based on the displacement direction; and displaying a dynamic movement of the front sight at a target adsorption velocity after adjusting the displacement velocity by the adsorption correction factor.

2. The method according to claim 1, wherein the aiming target of the aiming operation is correlated with the adsorption detection range based on the displacement direction when there is an intersection between an extension line in the displacement direction and the adsorption detection range.

3. The method according to claim 1, wherein the acquiring an adsorption correction factor associated with the displacement direction comprises:

acquiring an adsorption point corresponding to the front sight in the first virtual object;

determining a first correction factor as the adsorption correction factor, when a first distance between the front sight at a current frame and the adsorption point is less than a second distance between the front sight at a last frame and the adsorption point; and determining a second correction factor as the adsorption correction factor when the first distance is greater than or equal to the second distance.

4. The method according to claim 3, wherein the acquiring an adsorption point corresponding to the front sight in the first virtual object comprises:

when a horizontal height of the front sight is greater than or equal to a horizontal height of a target dividing line of the first virtual object, determining a head skeleton point of the first virtual object as the adsorption point, wherein the target dividing line is configured to distinguish a head and a body of the first virtual object; and when a horizontal height of the front sight is less than a horizontal height of the target dividing line, determining a somatic skeleton point of the first virtual object as the adsorption point, wherein the somatic skeleton point is a skeleton point on a vertical central axis of the first virtual object which has the same horizontal height as the front sight.

5. The method according to claim 1, wherein the method further comprises:

determining a friction correction factor corresponding to the front sight when the front sight is within a friction detection range of the adsorption detection range;

in response to a steering operation on the front sight, correcting a steering angle corresponding to the steering operation based on the friction correction factor to acquire a target steering angle; and controlling orientation of the front sight in the virtual scenario to rotate by the target steering angle.

6. The method according to claim 1, wherein the method further comprises:

when the front sight moves from an inside of the adsorption detection range to an outside of the adsorption detection range, and a duration for which the front sight remains outside the adsorption detection range exceeds a first duration, keeping the displacement velocity the same.

7. The method according to claim 1, wherein the method further comprises:

when the front sight is located within the adsorption detection range of a second virtual object in the virtual scenario that is capable of being adsorbed, controlling the front sight to move to the second virtual object.

8. An electronic device, comprising one or more processors and one or more memories, the one or more memories storing at least one computer program, the at least one computer program being loaded and executed by the one or more processors and causing the electronic device to implement a method for controlling a front sight of a virtual prop in a virtual scenario including:

displaying a first virtual object in the virtual scenario, the first virtual object having an adsorption detection range;

in response to an aiming operation on the virtual prop, acquiring a displacement direction and a displacement velocity of the front sight associated with the aiming operation;

acquiring an adsorption correction factor associated with the displacement direction when it is determined that an aiming target of the aiming operation is correlated with the adsorption detection range based on the displacement direction; and displaying a dynamic movement of the front sight at a target adsorption velocity after adjusting the displacement velocity by the adsorption correction factor.

9. The electronic device according to claim 8, wherein the aiming target of the aiming operation is correlated with the adsorption detection range based on the displacement direction when there is an intersection between an extension line in the displacement direction and the adsorption detection range.

10. The electronic device according to claim 8, wherein the acquiring an adsorption correction factor associated with the displacement direction comprises:

acquiring an adsorption point corresponding to the front sight in the first virtual object;

determining a first correction factor as the adsorption correction factor, when a first distance between the front sight at a current frame and the adsorption point is less than a second distance between the front sight at a last frame and the adsorption point; and determining a second correction factor as the adsorption correction factor when the first distance is greater than or equal to the second distance.

11. The electronic device according to claim 10, wherein the acquiring an adsorption point corresponding to the front sight in the first virtual object comprises:

when a horizontal height of the front sight is greater than or equal to a horizontal height of a target dividing line of the first virtual object, determining a head skeleton point of the first virtual object as the adsorption point, wherein the target dividing line is configured to distinguish a head and a body of the first virtual object; and when a horizontal height of the front sight is less than a horizontal height of the target dividing line, determining a somatic skeleton point of the first virtual object as the adsorption point, wherein the somatic skeleton point is a skeleton point on a vertical central axis of the first virtual object which has the same horizontal height as the front sight.

12. The electronic device according to claim 8, wherein the method further comprises:

determining a friction correction factor corresponding to the front sight when the front sight is within a friction detection range of the adsorption detection range;

in response to a steering operation on the front sight, correcting a steering angle corresponding to the steering operation based on the friction correction factor to acquire a target steering angle; and controlling orientation of the front sight in the virtual scenario to rotate by the target steering angle.

13. The electronic device according to claim 8, wherein the method further comprises:

when the front sight moves from an inside of the adsorption detection range to an outside of the adsorption detection range, and a duration for which the front sight remains outside the adsorption detection range exceeds a first duration, keeping the displacement velocity the same.

14. The electronic device according to claim 8, wherein the method further comprises:

when the front sight is located within the adsorption detection range of a second virtual object in the virtual scenario that is capable of being adsorbed, controlling the front sight to move to the second virtual object.

15. A non-transitory computer-readable storage medium, storing at least one computer program, the at least one computer program being loaded and executed by a processor of an electronic device and causing the electronic device to implement a method for controlling a front sight of a virtual prop in a virtual scenario including:

displaying a first virtual object in the virtual scenario, the first virtual object having an adsorption detection range;

in response to an aiming operation on the virtual prop, acquiring a displacement direction and a displacement velocity of the front sight associated with the aiming operation;

acquiring an adsorption correction factor associated with the displacement direction when it is determined that an aiming target of the aiming operation is correlated with the adsorption detection range based on the displacement direction; and displaying a dynamic movement of the front sight at a target adsorption velocity after adjusting the displacement velocity by the adsorption correction factor.

16. The non-transitory computer-readable storage medium according to claim 15, wherein the aiming target of the aiming operation is correlated with the adsorption detection range based on the displacement direction when there is an intersection between an extension line in the displacement direction and the adsorption detection range.

17. The non-transitory computer-readable storage medium according to claim 15, wherein the acquiring an adsorption correction factor associated with the displacement direction comprises:

acquiring an adsorption point corresponding to the front sight in the first virtual object;

determining a first correction factor as the adsorption correction factor, when a first distance between the front sight at a current frame and the adsorption point is less than a second distance between the front sight at a last frame and the adsorption point; and determining a second correction factor as the adsorption correction factor when the first distance is greater than or equal to the second distance.

18. The non-transitory computer-readable storage medium according to claim 15, wherein the method further comprises:

determining a friction correction factor corresponding to the front sight when the front sight is within a friction detection range of the adsorption detection range;

in response to a steering operation on the front sight, correcting a steering angle corresponding to the steering operation based on the friction correction factor to acquire a target steering angle; and controlling orientation of the front sight in the virtual scenario to rotate by the target steering angle.

19. The non-transitory computer-readable storage medium according to claim 15, wherein the method further comprises:

when the front sight moves from an inside of the adsorption detection range to an outside of the adsorption detection range, and a duration for which the front sight remains outside the adsorption detection range exceeds a first duration, keeping the displacement velocity the same.

20. The non-transitory computer-readable storage medium according to claim 15, wherein the method further comprises:

when the front sight is located within the adsorption detection range of a second virtual object in the virtual scenario that is capable of being adsorbed, controlling the front sight to move to the second virtual object.

* * * * *